US006189813B1

(12) United States Patent
Skeath et al.

(10) Patent No.: US 6,189,813 B1
(45) Date of Patent: Feb. 20, 2001

(54) RAYLEIGH-BREAKUP ATOMIZING DEVICES AND METHODS OF MAKING RAYLEIGH-BREAKUP ATOMIZING DEVICES

(75) Inventors: Perry R Skeath, Silver Spring, MD (US); John R Saylor, Alexandria, VA (US); Amy L Rovelstad, Painted Post, NY (US)

(73) Assignee: Corning Incorporated, Corning, NY (US)

( * ) Notice: Under 35 U.S.C. 154(b), the term of this patent shall be extended for 0 days.

(21) Appl. No.: 09/214,780

(22) PCT Filed: Jul. 8, 1997

(86) PCT No.: PCT/US97/11622

§ 371 Date: Jan. 8, 1999

§ 102(e) Date: Jan. 8, 1999

(87) PCT Pub. No.: WO98/01228

PCT Pub. Date: Jan. 15, 1998

Related U.S. Application Data

(60) Provisional application No. 60/021,307, filed on Jul. 8, 1996, provisional application No. 60/021,308, filed on Jul. 8, 1996, and provisional application No. 60/021,309, filed on Jul. 8, 1996.

(51) Int. Cl.[7] .......................................................... B05B 7/08

(52) U.S. Cl. ....................... 239/424.5; 239/433; 261/78.2

(58) Field of Search .................................... 239/423, 424, 239/424.5, 433, 434; 261/78.2

(56) References Cited

U.S. PATENT DOCUMENTS

| | | |
|---|---|---|
| Re. 32,572 | 1/1988 | Hawkins et al. . |
| 3,790,086 | 2/1974 | Masai . |

(List continued on next page.)

FOREIGN PATENT DOCUMENTS

| | | |
|---|---|---|
| 0 249 186 | 6/1987 | (EP) . |
| 0617112 A2 | 9/1994 | (EP) . |
| 2 444 514 | 12/1978 | (FR) . |
| 1207877 | 10/1970 | (GB) . |
| 92 10301 | 6/1992 | (WO) . |

OTHER PUBLICATIONS

Yakovlev, S.A., *Vibrating capillary generator for obtaining test aerosols with a diameter of less than two microns*, Measurement Techniques, vol. 39, No. 2, 1996.

A new apparatus for the production of monodisperse sprays at high flow rate Brenn et al., Chemical Engineering Science, vol. 52, No. 2, pp. 237–244, 1977.

20/20 Atomization–Using MEMS to obtain 20Tm sprays with low pressure air Published May 20, 1997, at ILASS Conference, pp. 238–242.

Micromachined Silicon Fuel Atomizers for Gas Turbine Engines, Singh et al. Case Wester Reserve Univ & Parker Hannifin Corp. Cleveland Ohio.

Atomization and Sprays, Arthur H. Lefebvre, 1989, pp. 4–10.

Experimental Exploration of the Thermal Structure of an Array of Burning Droplett Streams, Queiroz & Yao, Combustion and Flame 82: 346–360 (1990).

Lefebvre, “Atomization and Sprays”, 1989, Hemisphere Publishing Corp., XP002096081, pp. 30–31.

*Primary Examiner*—Lesley D. Morris
(74) *Attorney, Agent, or Firm*—Edward F Murphy; Timothy R. Krogh

(57) ABSTRACT

Atomizing devices are provided that form droplets through the Rayleigh breakup mechanism. Various embodiments include one or more of the following features. Liquid orifices form jets of liquid that form droplets. Gas orifices provide gas coflow that inhibits coalescence of the droplets. The liquid orifices can have non-circular cross-sectional shapes to promote Rayleigh breakup. Fluidic oscillators can also be provided to promote Rayleigh breakup. Supply networks are provided to supply gas and liquid to the gas and liquid orifices, respectively.

40 Claims, 24 Drawing Sheets

U.S. PATENT DOCUMENTS

| | | |
|---|---|---|
| 3,921,916 | 11/1975 | Bassous . |
| 3,948,442 | 4/1976 | Dewey . |
| 3,949,410 | 4/1976 | Bassous et al. . |
| 3,958,255 | 5/1976 | Chiou et al. . |
| 4,007,464 | 2/1977 | Bassous et al. . |
| 4,014,029 | 3/1977 | Lane et al. . |
| 4,047,184 | 9/1977 | Bassous et al. . |
| 4,066,491 | 1/1978 | Ruh et al. . |
| 4,106,976 | 8/1978 | Chiou et al. . |
| 4,157,935 | 6/1979 | Solyst . |
| 4,169,008 | 9/1979 | Kurth . |
| 4,216,477 | 8/1980 | Matsuda et al. . |
| 4,223,320 | 9/1980 | Paranjpe et al. . |
| 4,312,008 | 1/1982 | Taub et al. . |
| 4,314,259 | 2/1982 | Cairns et al. . |
| 4,357,614 | 11/1982 | Tamai . |
| 4,455,192 | 6/1984 | Tamai . |
| 4,470,875 | 9/1984 | Poteat . |
| 4,596,364 | 6/1986 | Bauer ................................. 239/590 |
| 4,601,777 | 7/1986 | Hawkins et al. . |
| 4,612,554 | 9/1986 | Poleshuk . |
| 4,639,748 | 1/1987 | Drake et al. . |
| 4,726,522 | 2/1988 | Kokubo et al. ................... 239/102.2 |
| 4,768,751 | 9/1988 | Giachino et al. . |
| 4,789,425 | 12/1988 | Drake et al. . |
| 4,828,184 | 5/1989 | Gardner et al. . |
| 4,864,329 | 9/1989 | Kneezel et al. . |
| 4,871,489 | 10/1989 | Ketcham . |
| 4,875,968 | 10/1989 | O'Neill et al. . |
| 4,907,748 | 3/1990 | Gardner et al. . |
| 4,924,097 | 5/1990 | Browner et al. . |
| 5,006,202 | 4/1991 | Hawkins et al. . |
| 5,030,971 | 7/1991 | Drake et al. . |
| 5,041,190 | 8/1991 | Drake et al. . |
| 5,068,006 | 11/1991 | Fisher . |
| 5,119,115 | 6/1992 | Buat et al. . |
| 5,119,116 | 6/1992 | Yu . |
| 5,124,717 | 6/1992 | Campanelli et al. . |
| 5,132,707 | 7/1992 | O'Neill . |
| 5,136,310 | 8/1992 | Drews . |
| 5,141,596 | 8/1992 | Hawkins et al. . |
| 5,144,341 | 9/1992 | El Haten et al. . |
| 5,160,577 | 11/1992 | Deshpande . |
| 5,161,742 | 11/1992 | Hofmann et al. . |
| 5,165,292 | 11/1992 | Prohaska . |
| 5,167,776 | 12/1992 | Bhaskar et al. . |
| 5,201,987 | 4/1993 | Hawkins et al. . |
| 5,204,690 | 4/1993 | Lorenze, Jr. et al. . |
| 5,212,496 | 5/1993 | Badesha et al. . |
| 5,256,352 | 10/1993 | Snyder et al. . |
| 5,306,370 | 4/1994 | Herko et al. . |
| 5,383,597 | 1/1995 | Sooriakumar et al. . |
| 5,402,937 | 4/1995 | Buchholz et al. . |
| 5,421,952 | 6/1995 | Buchholz et al. ..................... 216/33 |
| 5,435,884 | 7/1995 | Simmons et al. . |
| 5,449,114 | 9/1995 | Wells et al. . |

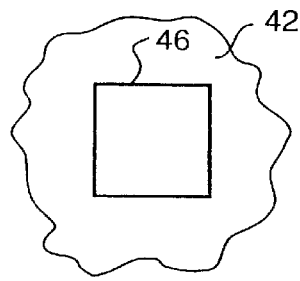 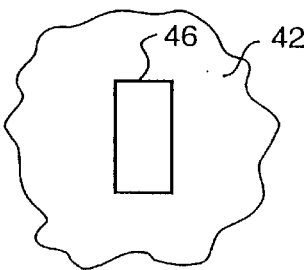 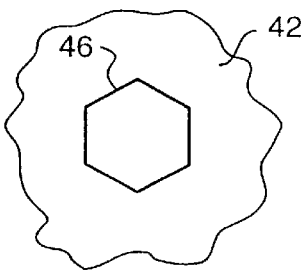
FIG. 10     FIG. 11     FIG. 12
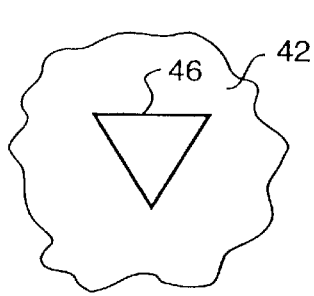 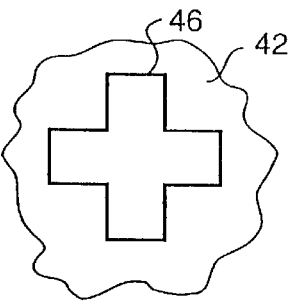 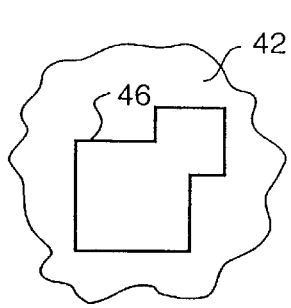
FIG. 13     FIG. 14     FIG. 15
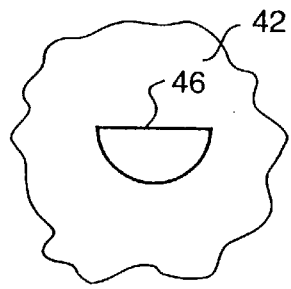 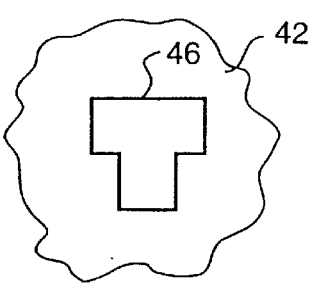
FIG. 16     FIG. 17

RAYLEIGH-BREAKUP ATOMIZING DEVICES AND METHODS OF MAKING RAYLEIGH-BREAKUP ATOMIZING DEVICES

The present application claims the benefit of U.S. Provisional Application Ser. Nos. 60/021,307, 60/021,308, and 60/021,309 filed Jul. 8, 1996.

The U.S. Government may have a license to practice parts of this invention as provided for by the terms of contract No. DAAL01-93-C-0039 awarded by the U.S. Army Research Laboratory.

BACKGROUND OF THE INVENTION

1. Field of the Invention

The present invention relates to atomizing devices and to methods of making the same and, more particularly, to micromachined atomizing devices that produce small droplets with a narrow droplet size distribution and to methods of making the same.

2. Description of the Related Art

Liquid atomizing devices are used in various mechanisms, such as medical nebulizers and fuel injectors for combustion chambers. The performance of many of these mechanisms can be improved if the atomizing device provides a spray with very small droplets or a narrow size distribution. For example, small droplets improve the effectiveness of medical nebulizers because small droplets (e.g., between 2 and 5 micrometers) can be efficiently deposited deep into the lungs. Additionally, small droplets (e.g., less than 20 micrometers) improve the efficiency of combustion devices by causing faster vaporization of the fuel.

Conventional atomizing devices typically provide a spray having droplets within a wide range of sizes, including a small percentage of droplets that have a Sauter mean diameter smaller than 10 micrometers. Conventional atomizing devices have rarely been able to provide a spray having droplets limited to a small range of sizes and having a Sauter mean diameter smaller than 10 micrometers, without employing additional mechanisms such as high ultrasonic power or high-voltage electrostatic charging.

The failure of conventional atomizing devices to provide a small range and small droplets can be attributed to the manner in which these devices perform atomization. Conventional atomizing devices break bulk liquid into relatively large ligaments, break the ligaments into relatively large drops through atomization, and break the large drops into smaller droplets through secondary atomization. As the droplets become smaller than 100 micrometers, they become harder to break, and secondary atomization typically ceases, thus preventing most of the droplets from becoming as small as 10 micrometers. Also, since the bulk liquid is much larger than the desired droplet size and, therefore, must be broken down a number of times to become relatively small, the droplets ultimately formed by conventional devices will have a relatively wide size range.

Efforts have been made to decrease droplet size by increasing the amount of gas forced through the atomizing device. However, this results in a large gas-liquid mass ratio, which is undesirable for many applications because it requires a large gas pump, a large amount of gas, and a high gas velocity.

Another problem associated with conventional atomizing devices is that two devices, even of the same type, often will have different spray characteristics. These differing spray characteristics result from very minor variations in the structure of the atomizing device. With current manufacturing methods, these variations occur more frequently than is desired.

SUMMARY OF THE INVENTION

An object of the present invention is to provide atomizing devices that solve the foregoing problems.

Another object of the present invention is to provide atomizing devices that produce a spray having droplets with a Sauter mean diameter of 10 micrometers or smaller.

Yet another object of the present invention is to provide atomizing devices that produce a spray having droplets within a small range of diameters.

Yet another object of the present invention is to provide atomizing devices having a small gas-liquid mass ratio.

Yet another object of the present invention is to provide atomizing devices of very small size, yet capable of substantial throughput of atomized liquid.

Yet another object of the present invention is to provide atomizing devices that can be mass produced and that, nevertheless, have consistent spray characteristics from device to device.

Additional objects and advantages of the invention will become apparent from the description which follows. Additional advantages may also be learned by practice of the invention.

In a broad aspect, the invention provides a method of atomizing a liquid, comprising the steps of forming a jet of liquid to form droplets of the liquid through Rayleigh breakup, and flowing a gas against the droplets to inhibit coalescence of the droplets.

In another broad aspect, the invention provides an atomizing device comprising a liquid orifice for forming a jet of liquid that breaks into droplets of the liquid through Rayleigh breakup, and a gas orifice for flowing a gas against the droplets to inhibit coalescence of the droplets.

In another broad aspect, the invention provides a method of forming an atomizing device, comprising the steps of forming a gas supply network and a liquid supply network in a substantially planar first layer and a substantially planar second layer, forming a gas orifice in the first layer that forms a jet of liquid that breaks into droplets of the liquid through Rayleigh breakup, forming a gas orifice in the first layer for flowing gas against the droplets to inhibit coalescence of the droplets, and connecting the first and second layers such that the gas and liquid supply networks supply gas and liquid to the gas and liquid orifices, respectively.

In another broad aspect, the invention provides an atomizing device comprising a liquid orifice for forming a jet of liquid that breaks into droplets of the liquid through Rayleigh breakup, and a device in the orifice that creates a vibration in the jet of liquid to promote Rayleigh breakup.

It is to be understood that both the foregoing summary and the following detailed description are exemplary and explanatory only and are not restrictive of the invention, as claimed.

BRIEF DESCRIPTION OF THE DRAWINGS

The invention will be described in conjunction with the accompanying drawings, which illustrate presently preferred embodiments of the invention.

FIG. 1 is a top view of a first embodiment of an atomizing device according to the present: invention.

FIGS. 10 to 17 are top views of fifth through twelfth embodiments of atomizing devices according to the present invention.

DESCRIPTION OF THE PREFERRED EMBODIMENTS

Figure 1:
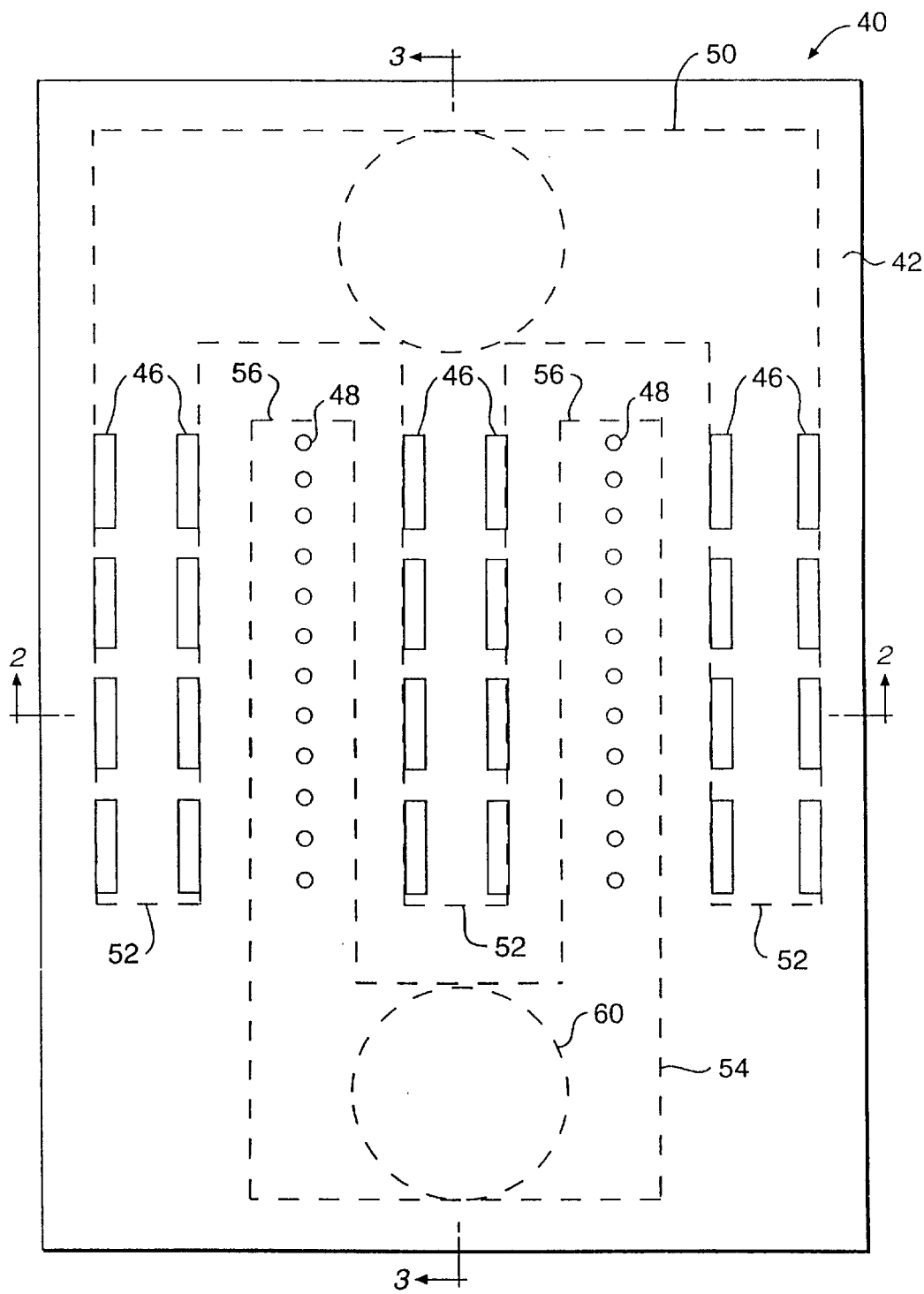

Reference will now be made in detail to the preferred embodiments illustrated in the drawings.

Figure 2:
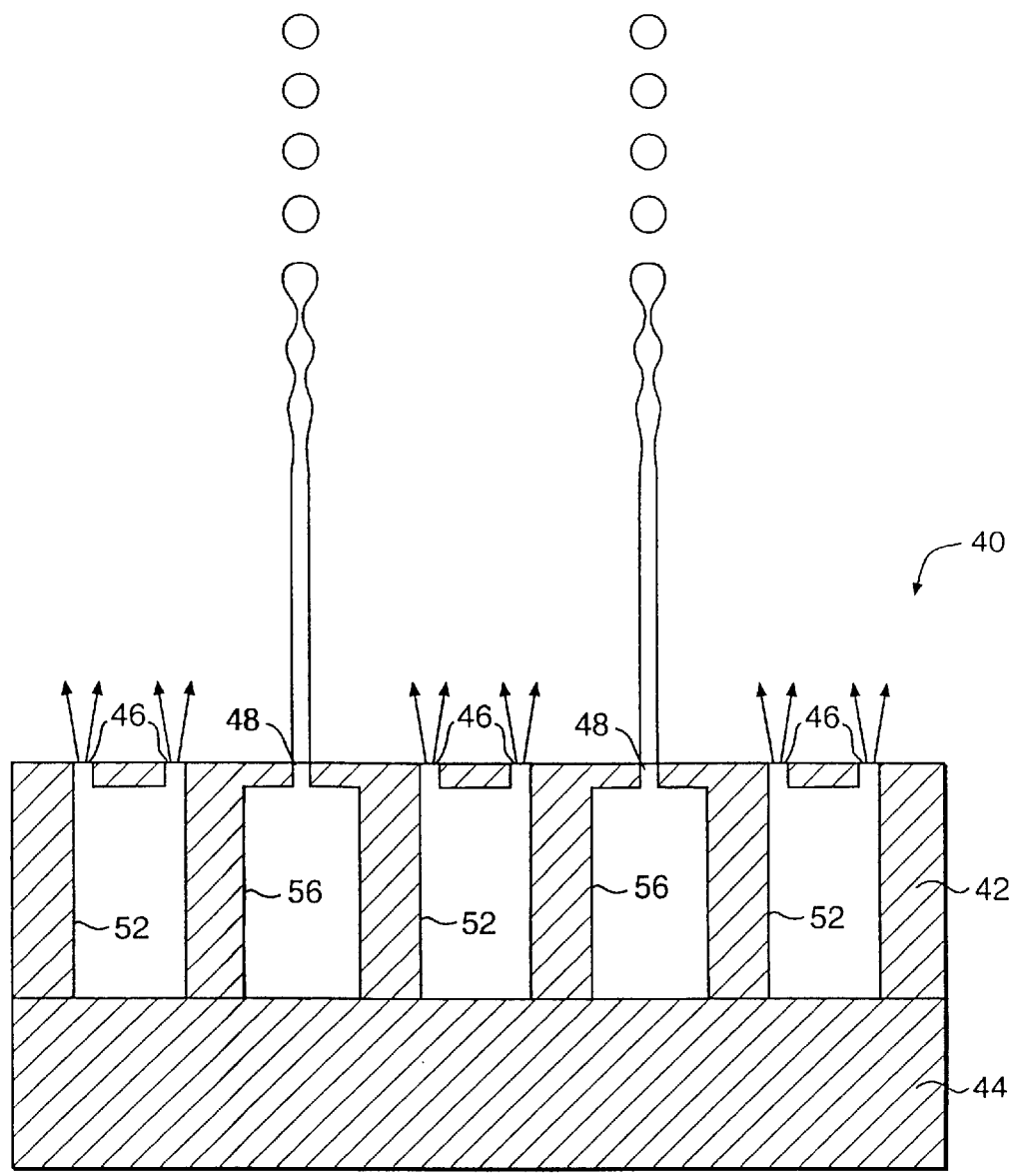
FIG. 2 is a sectional view of the first embodiment taken along line 2—2 of FIG. 1.
Figure 3:
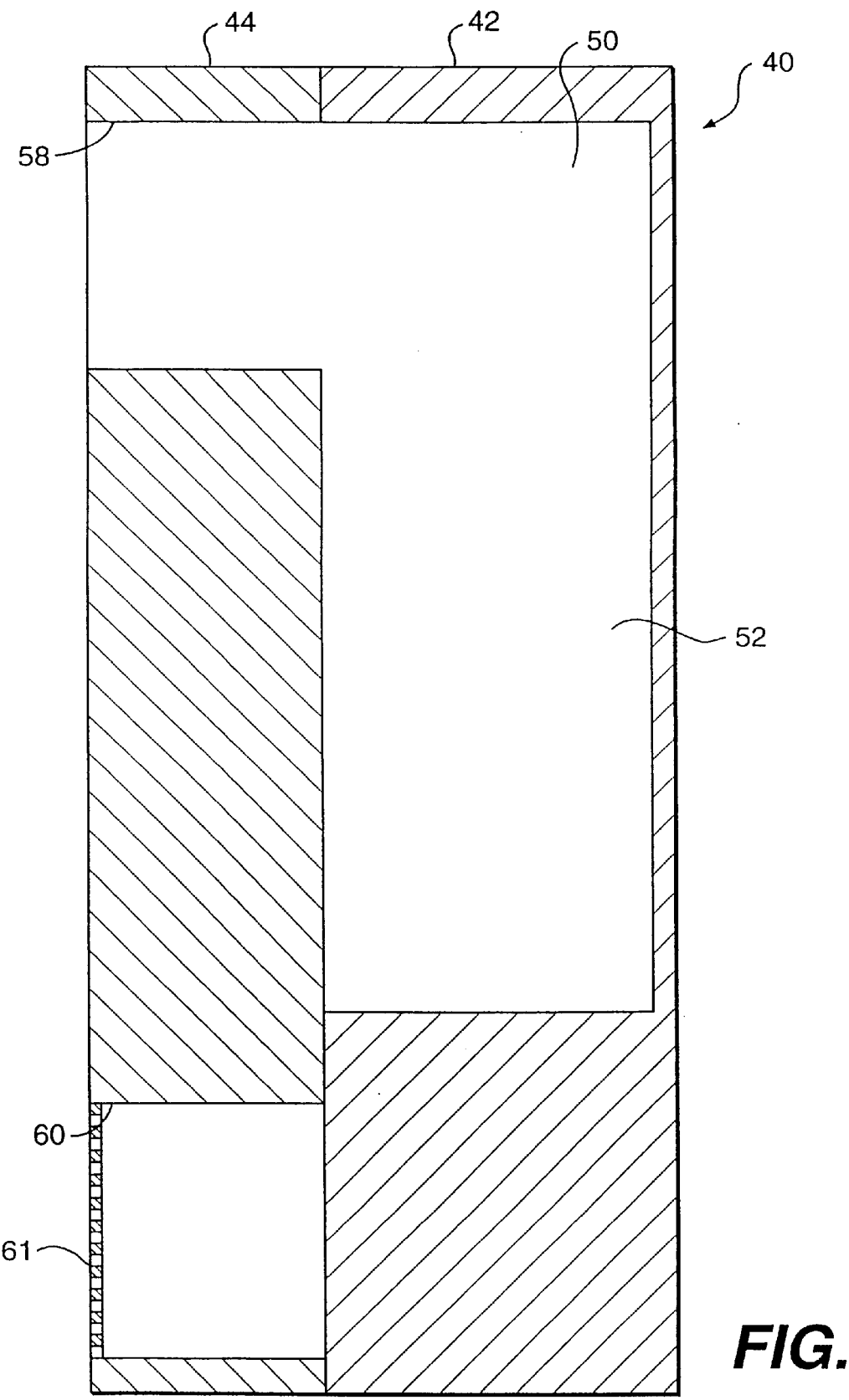
FIG. 3 is a sectional view of the first embodiment taken along line 3—3 of FIG. 1.
Figure 4:
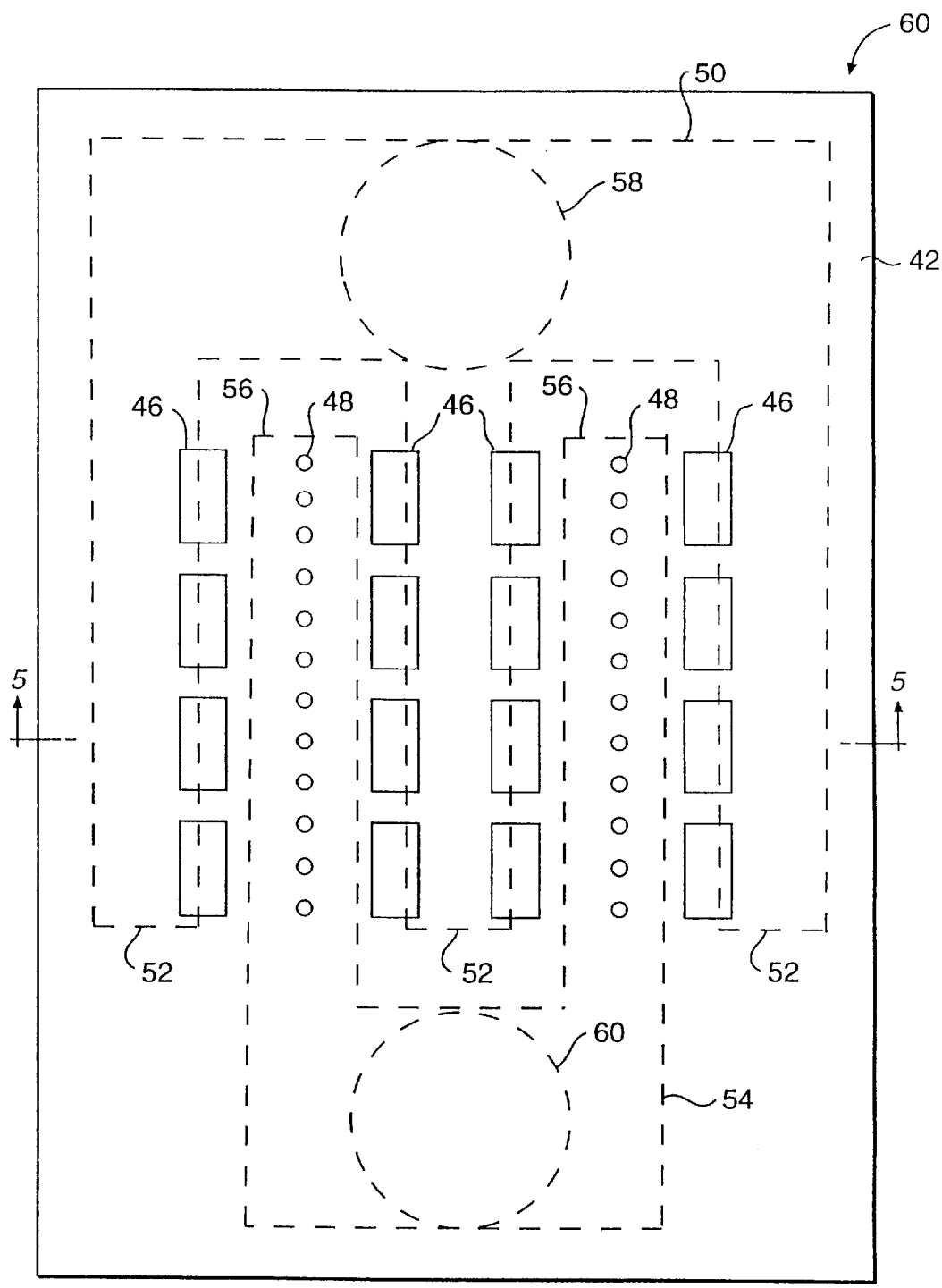
FIG. 4 is a top view of a second embodiment of an atomizing device according to the present invention.
Figure 5:
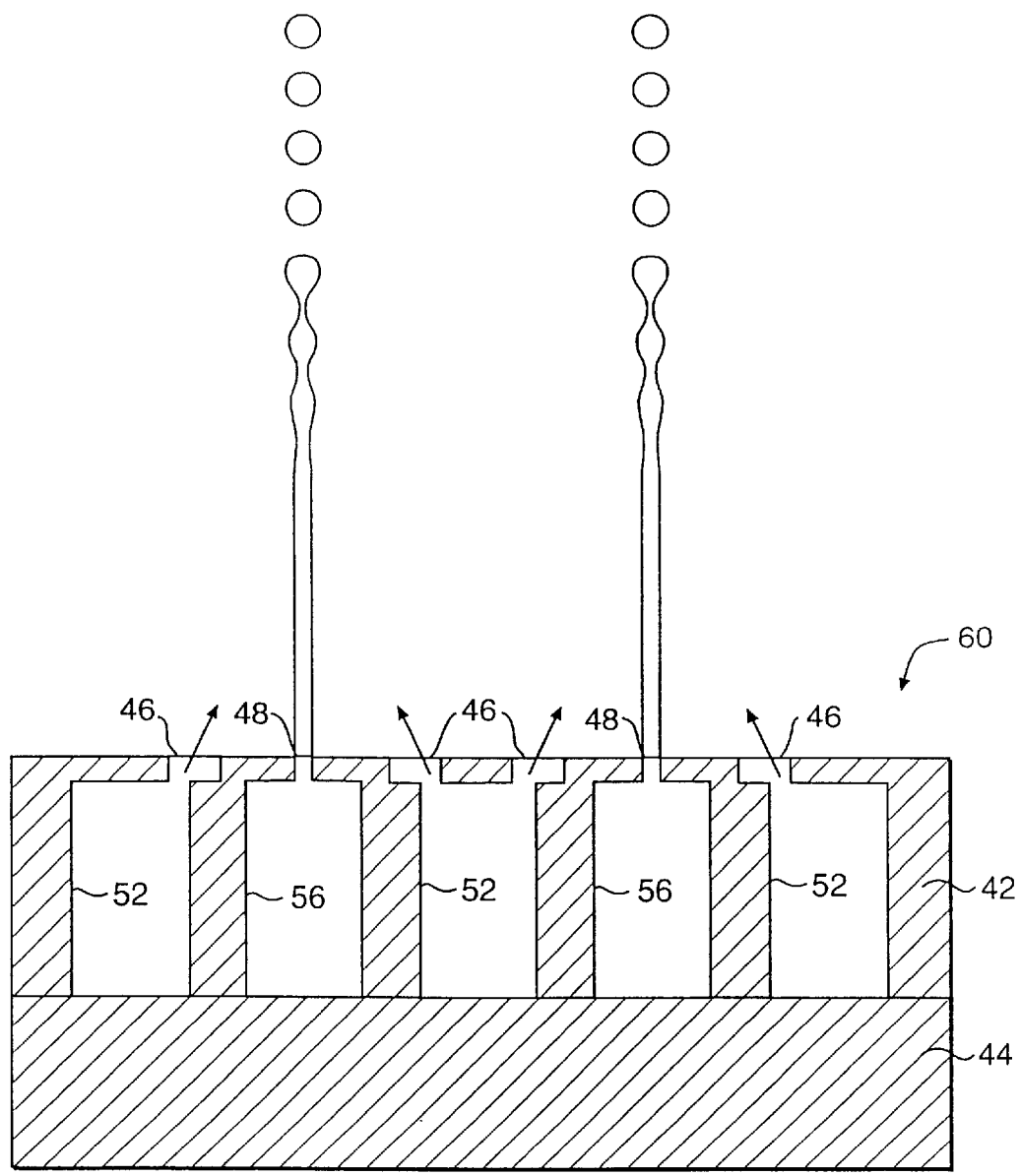
FIG. 5 is a sectional view of the second embodiment taken along line 5—5 of FIG. 4.

A first embodiment of an atomizing device 40 is shown in FIGS. 1 and 2. The atomizing device 413 includes a substantially planar first layer 42 and a substantially planar second layer 44. Each of the first and second layers 42 and 44 preferably has an area of 1 square millimeter per 5 milliliters per minute of atomized liquid. More preferably, each of the first and second layers has a length of 5 millimeters, a width of 5 millimeters, and a thickness of 1 millimeter.

The first and second layers 42 and 44 are preferably made of a material that can be micromachined and precisely fused together. More preferably, the first and second layers are formed of an etchable material, such as an elemental semiconductor material or silicon carbide. Suitable semiconductor materials include (100) orientation silicon, polycrystalline silicon, and germanium. Unless indicated otherwise in this specification, it is presently preferred that the layers of this embodiment and the other embodiments be made of (100) orientation silicon. However, in some instances, the layers can be made of other materials, such as PYREX.

The first layer has liquid orifices 48, which will form jets of liquid that break into droplets through Rayleigh breakup. The liquid orifices 48 preferably have a circular cross-sectional shape, which causes minimal jet perturbation. The liquid orifices 48 preferably have a thickness of 5 micrometers. The diameter of the liquid orifices 48 is preferably approximately half the desired Sauter mean diameter of the droplets. In the preferred embodiment, the liquid orifices 48 have a 5 micrometer diameter to produce droplets having a Sauter mean diameter of 10 micrometers. The liquid orifices 48 are preferably spaced from each other by a distance equal to 10 times the diameter of the liquid orifices 48.

The first layer also has gas orifices 46 that flow gas against the droplets to inhibit coalescence of the droplets. The gas orifices 46 preferably have a rectangular cross-sectional shape, with a length of two to three times their width. More preferably, the gas orifices have a length of 45 micrometers, a width of 15 micrometers, and a thickness of 5 micrometers. In this embodiment, the direction of gas flow through the gas orifices 46 is substantially parallel to the direction of liquid flow through the liquid orifices 48.

The first and second layers 42 and 44 form a gas supply network that supplies gas to the gas orifices 46. The gas supply network includes a gas port 58, which supplies gas to a gas passage 50. The gas passage 50 supplies gas to gas channels 52, which supply gas to the gas orifices 46. In some cases, each gas channel 52 can be divided into a set of two or more adjacent narrow gas channels to increase the structural integrity of the first layer 42.

The first and second layers 42 and 44 also form a liquid supply network that supplies liquid to the liquid orifices 48. The liquid supply network includes a liquid port 60, which supplies liquid to a liquid passage 54. The liquid passage 54 supplies liquid to liquid channels 56, which supply liquid to the liquid orifices 48.

The gas and liquid channels 52 and 56 preferably have a width of 100 micrometers, a length of 1 to 2 millimeters, and a thickness almost equal to the thickness of the first layer 42. As shown in FIG. 1, the gas channels 52 and liquid channels 56 are preferably interdigitated.

The liquid port 60 preferably has a filter 61 at its inlet to remove impurities from the liquid to prevent clogging of the liquid orifices 48. The filter 61 preferably has extremely fine filter pores that can, for example, be circular or square. The filter pores preferably have widths less than or equal to ⅓ of the width of the liquid orifices 48. Also, the filter 61 is preferably configured such that trapped particles may be easily removed from the filter surface.

In the preferred embodiment, liquid forced through the liquid orifices 48 at, for example, a velocity of 10 meters per second and a flow rate of 5 grams per minute per square millimeter of surface occupied by the array of orifices will form jets of liquid that will break into droplets due to the Rayleigh breakup mechanism.

Gas forced through the gas orifices 46 at, for example, a flow rate of 0.6 standard liters per minute per square millimeter of surface occupied by the array of orifices, will form gas jets that expand as they move away from the gas orifices 46. The expanding gas jets eventually intersect the droplets formed by the jets of liquid and prevent coalescence of these droplets, i.e., they prevent adjacent droplets from colliding with each other and forming larger droplets. Coalescence is preferably inhibited by providing sufficient gas velocity so that drag does not cause droplets to slow and collide with each other. Coalescence is also preferably inhibited by providing sufficient gas turbulence to shift the trajectory of the droplets such that they will not collide with each other.

Droplets of nonuniform size will result if the liquid jets are sufficiently perturbed by the gas jets before Rayleigh breakup. Therefore, the gas orifices 46 should be arranged so that the gas jets do not perturb the liquid jets before breakup. This can be achieved by careful selection of the lateral separation of the gas and liquid orifices 46 and 48 ("lateral" refers to the direction orthogonal to the direction of liquid flow) and by careful selection of the gas velocity.

As the gas and liquid orifices 46 and 48 are moved further apart, the impact of the gas jets on the liquid moves further downstream. At an optimal separation (which can be determined empirically or by computational fluid dynamics modeling), the gas will impact the liquid far enough downstream, and the gas velocity will have slowed at this region of impact, such that the gas does not perturb the Rayleigh breakup and yet still inhibits coalescence. In the present embodiment, that lateral distance is preferably equal to approximately one breakup length of the liquid jets (i.e., the distance from the surface of the atomizing device to the location of breakup of the jet into droplets. In particular, a distance of 60 micrometers is presently preferred when the gas has a dispersion angle of 45°.

At the surface of the liquid jet, particularly near the liquid orifice, it is preferable that the gas not exceed the upper limit of differential velocity between the liquid jet and the gas under which the Rayleigh breakup process dominates the disintegration of the liquid jet into droplets. At the gas orifice 46, the gas velocity may be well above the upper limit of differential velocity under which the Rayleigh breakup process dominates. A suitable amount of lateral separation between gas and liquid orifices allows gas jets to expand laterally and to slow down sufficiently before gas flow from gas orifices reach liquid jet surfaces. The lateral separation also allows space for limited turbulence to develop in the expanding gas flow, which helps avoid droplet coalescence beyond a liquid jet breakup point by dispersing trajectories of a train of droplets from each liquid jet.

The atomizing device 40 can be produced in batches on wafers, similar to the production of batches of integrated circuits. For example, as shown in FIG. 43, a wafer is processed so as to have a plurality of sections that each constitute a first layer 42 of an atomizing device. Similarly, another wafer is processed so as to have a plurality of sections that each constitute a second layer 44 of an atomizing device. The wafers are aligned and connected to form a batch of atomizing devices, which are separated and connected to respective mounting structures. Alternatively, the atomizing devices could be connected to their respective mounting structures before separation.

For ease of reference, the following, more specific, description of the manufacture of an atomizing device according to the present invention will be provided with reference to only one of the plurality cf atomizing devices. The following description specifies certain processes that are presently preferred for micromachining the silicon layers. Unless otherwise indicated in this specification, the use of these processes is presently preferred for micromachining the silicon layers of all of the disclosed embodiments.

Initially, an etch stop is provided in the first layer 42 at a location corresponding to the bottom of the orifices 46 and 48 and the top of the channels 52 and 56. The etch stop can be provided by known methods such as diffusion, ion implantation and epitaxial growth, and wafer bonding and thinning. Although the wafer bonding and thinning process requires the use of two layers to form an etch stop, the product formed by this process will be considered a single first layer 42 in this specification. It should be noted that the formation of oxygen precipitants can be reduced by avoiding heating the first layer in the range of 600 to 1000° C. for an extended period of time and by using wafers with low oxygen content.

Next, a mask layer is deposited or grown on a first side of the first layer 42 and an etch pattern is then transferred into the mask layer in accordance with conventional techniques used in the production of integrated circuits. The first side of the first layer 42 is etched to form portions of the gas and liquid channels 52 and 56. The buried etch stop is used to avoid etching the walls of the orifices 46 and 48 during this channel etch. Preferably, this first side is etched using a vertical-wall micromachining process or a crystallographic etch, which are known for use in the production of integrated circuits. It is presently preferred to use a vertical wall micromachining process, such as a silicon deep-trench reactive ion etch (RIE) process, a vertical-wall photoelectrochemical (PEC) etch process (as described in Richard Mlcak, Electrochemical and Photoelectrochemical Micromachining of Silicon in HF Electrolytes (1994) (thesis, Massachusetts Institute of Technology), which is hereby incorporated by reference), a hydroxide-based etch process, or ultrasonic machining. The RIE process is presently preferred.

After the first side has been processed, a mask layer is deposited or grown on a second side of the first layer 42 with an etch pattern aligned with the etch on the first side. The second side is then etched to form the gas and liquid orifices 46 and 48, preferably using a vertical-wall micromachining process.

The second layer 44 is etched in the same manner as the first layer 42 to form the gas and liquid ports 58 and 60. If desired, the second layer 44 could be etched to form portions of the passages 50 and 54 and channels 52 and 56.

The first and second layers 42 and 44 are then connected to form the atomizing device 40. Silicon fusion bonding, with or without a flowable layer (e.g., borophosphosilicate glass or phosphosilicate glass) or an alloying layer (e.g., gold-indium or copper thin film), is the presently preferred process for connecting two silicon layers in this and the other embodiments.

FIGS. 4 to 9 show second through fourth embodiments that are similar in many respects to the first embodiment shown in FIGS. 1 to 3. Differences between the second through fourth embodiments and the first embodiment are described below.

The second embodiment of an atomizing device 60 is shown in FIGS. 4 and 5. In this embodiment, the gas orifices 46 are constructed such that a direction of gas flow through the gas orifices 46 extends at an angle relative to a direction of liquid flow through the liquid orifices 48. The gas orifices 46 are wider than in the first embodiment, preferably having a width of 65 micrometers.

This second embodiment allows gas to contact the liquid closer to the surface of the atomizing device 60 without decreasing the wall thickness of the channels 52 and 56 below a desired amount. It may be necessary to flow gas against the liquid close to the surface of the atomizing device 60 when, for example, the liquid jets have very small diameters (e.g., approximately 2 micrometers) and, therefore, will break into droplets only a short distance from the surface (e.g., approximately 100 micrometers).

Figure 6:
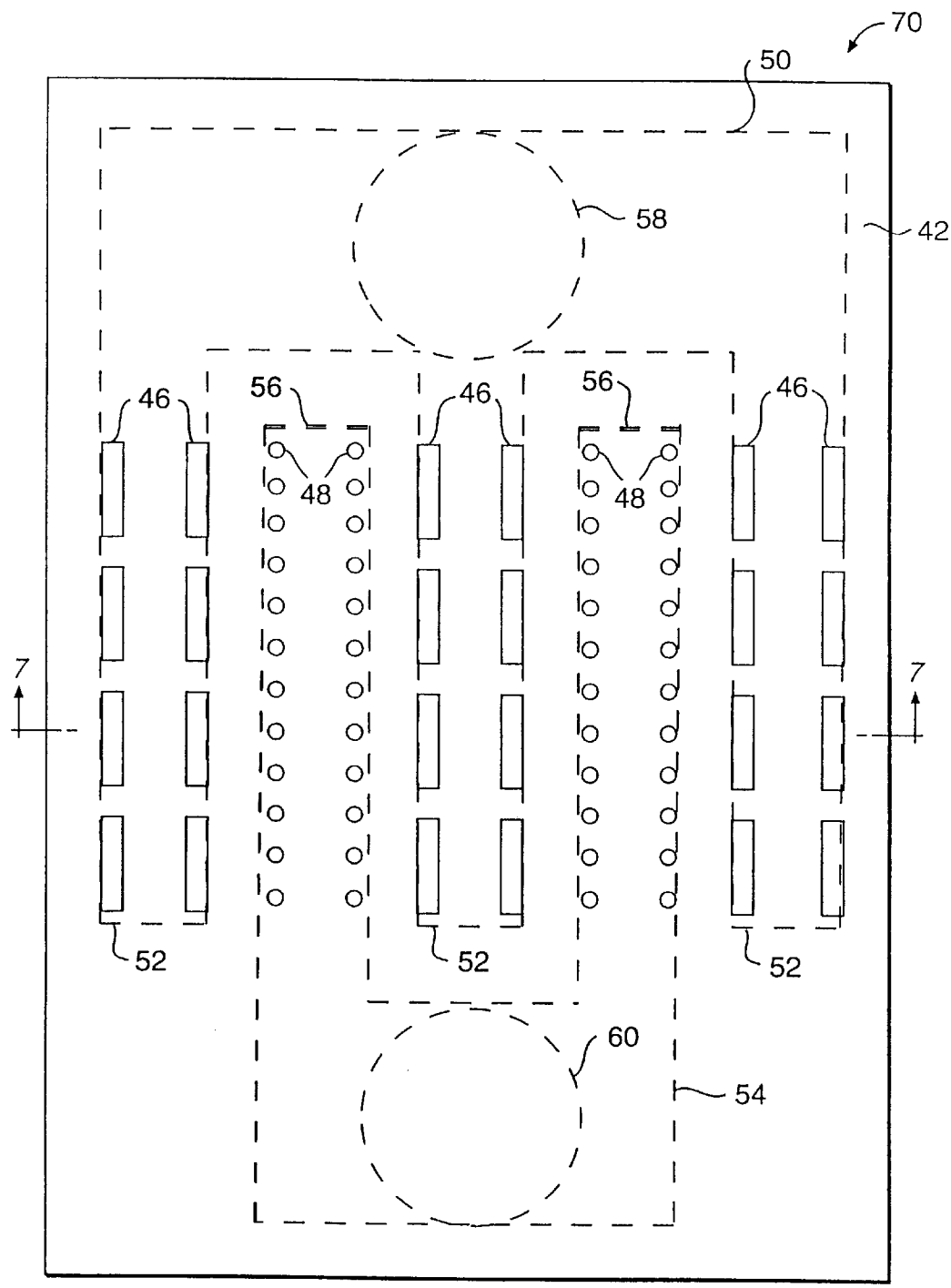
FIG. 6 is a top view of a third embodiment of an atomizing device according to the present invention.
Figure 7:
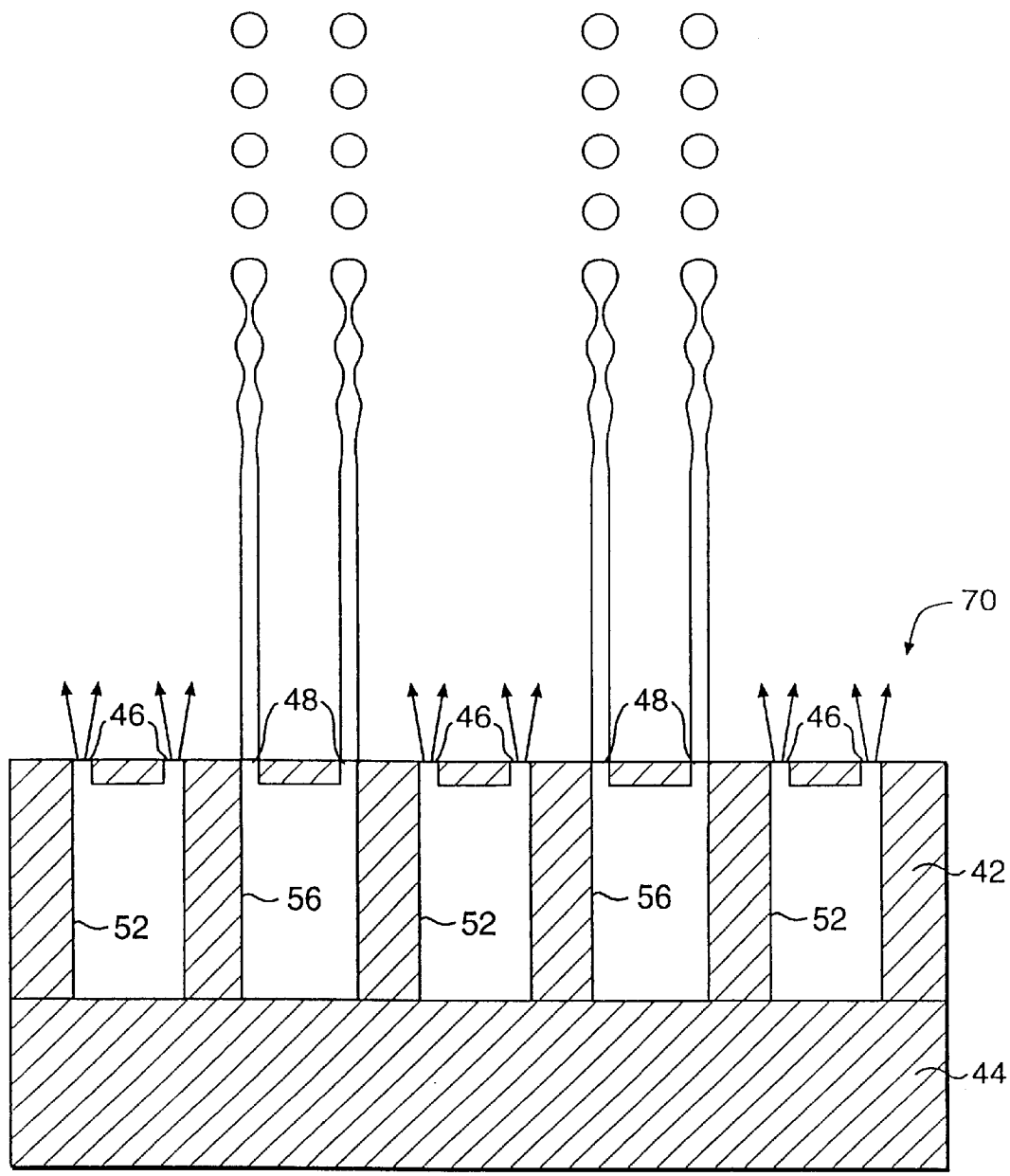
FIG. 7 is a sectional view of the third embodiment taken along line 7—7 of FIG. 6.

The third embodiment of an atomizing device 70 is shown in FIGS. 6 and 7. In this embodiment, two rows of liquid orifices 48 are provided for each liquid channel 56. This provides a greater liquid atomization rate.

Figure 8:
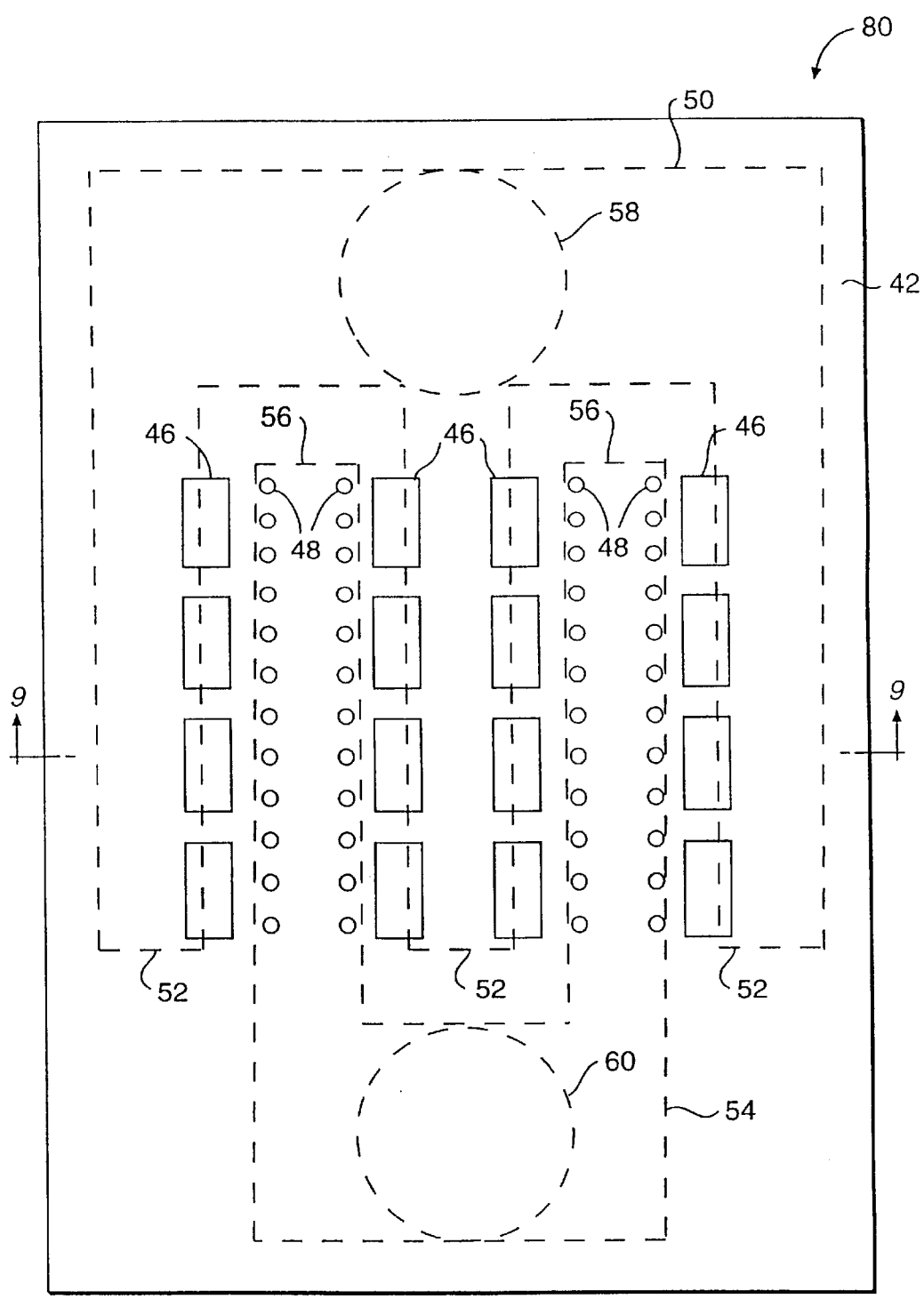
FIG. 8 is a top view of a fourth embodiment of an atomizing device according to the present invention.
Figure 9:
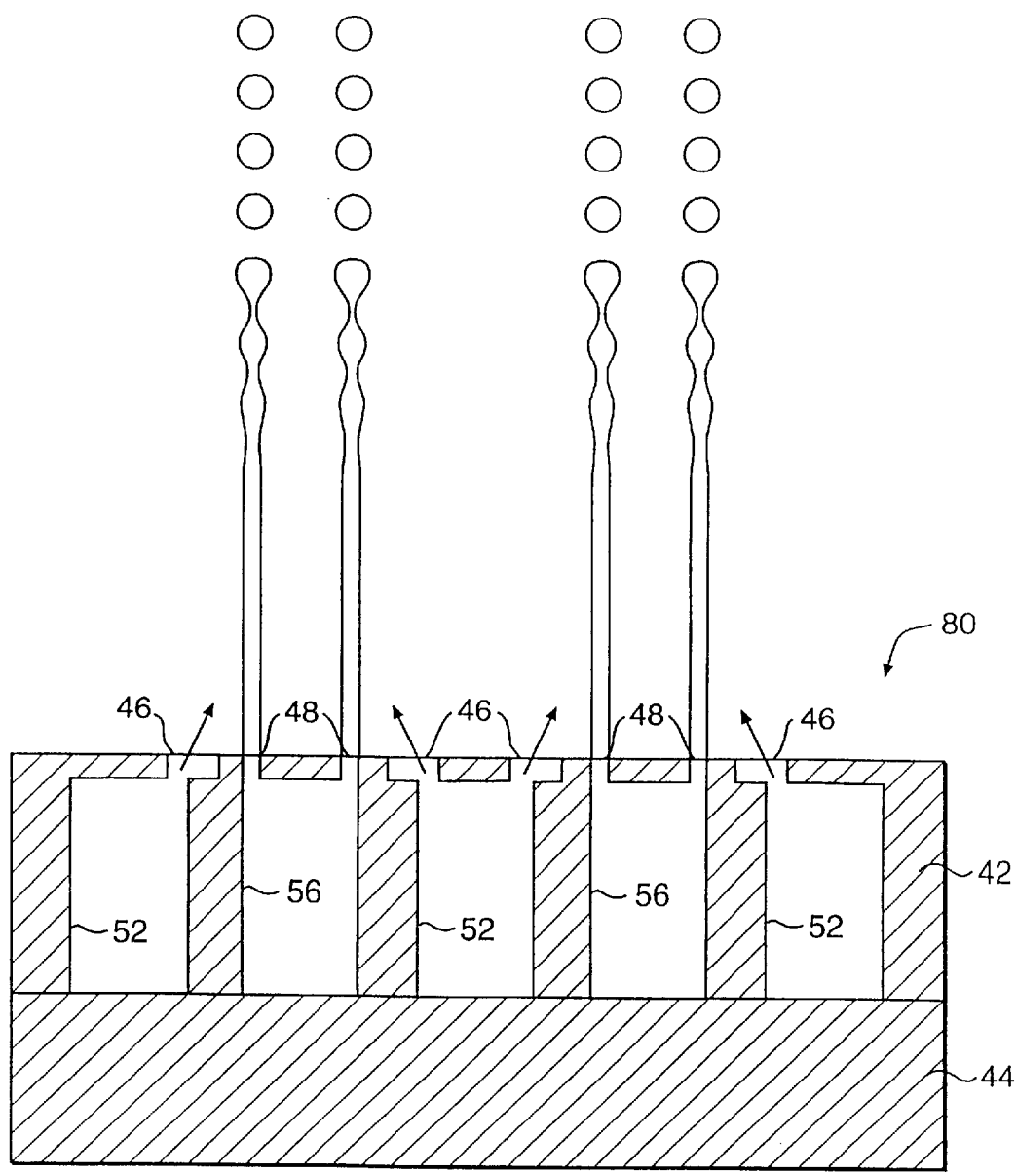
FIG. 9 is a sectional view of the fourth embodiment taken along line 9—9 of FIG. 8.
Figure 18:
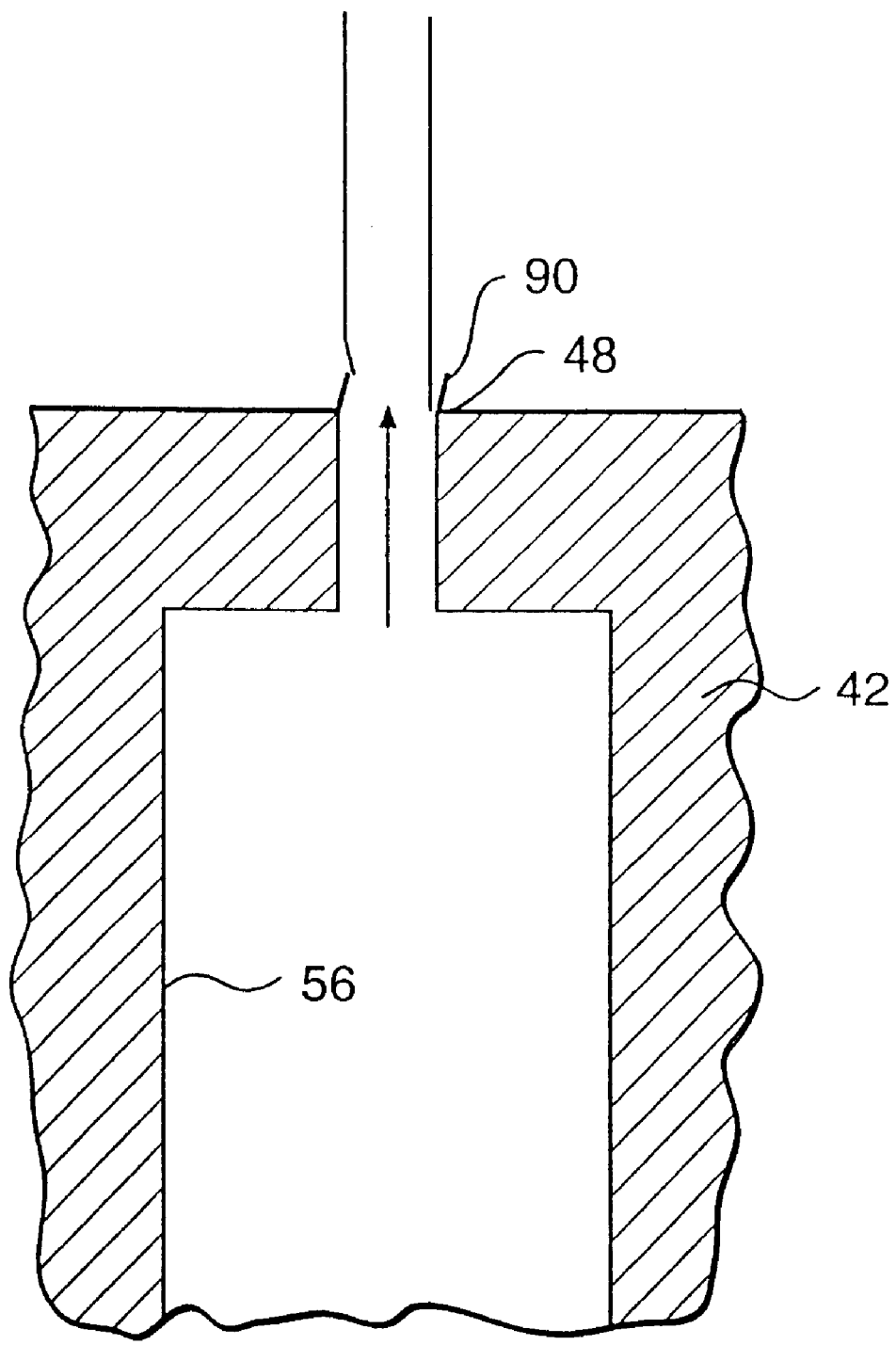
FIG. 18 is a sectional view of a thirteenth embodiment of an atomizing device according to the present invention.
Figure 19:
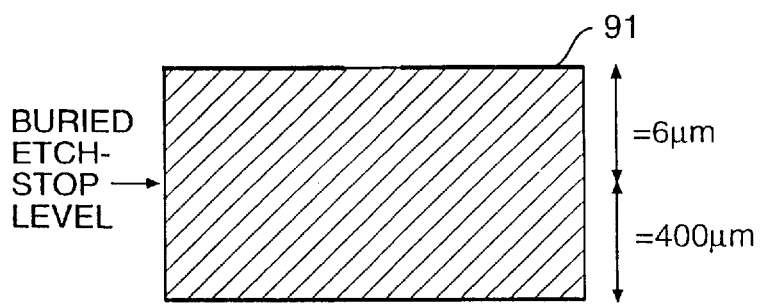
FIGS. 19 to 23 illustrate a preferred process for forming the atomizing device of the thirteenth embodiment.
Figure 20:
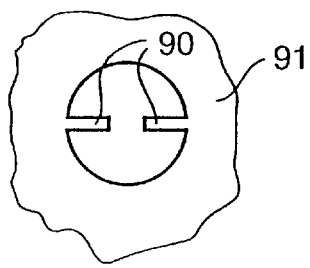
Figure 21:
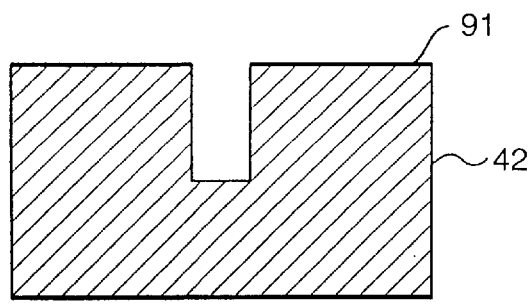
Figure 22:
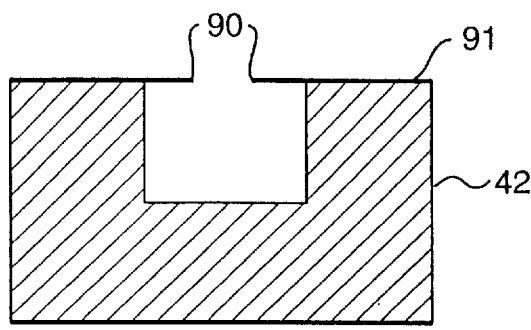
Figure 23:
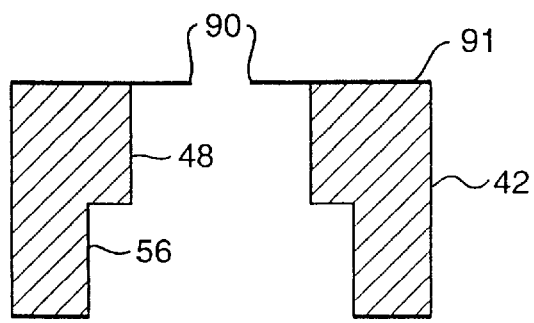
Figure 24:
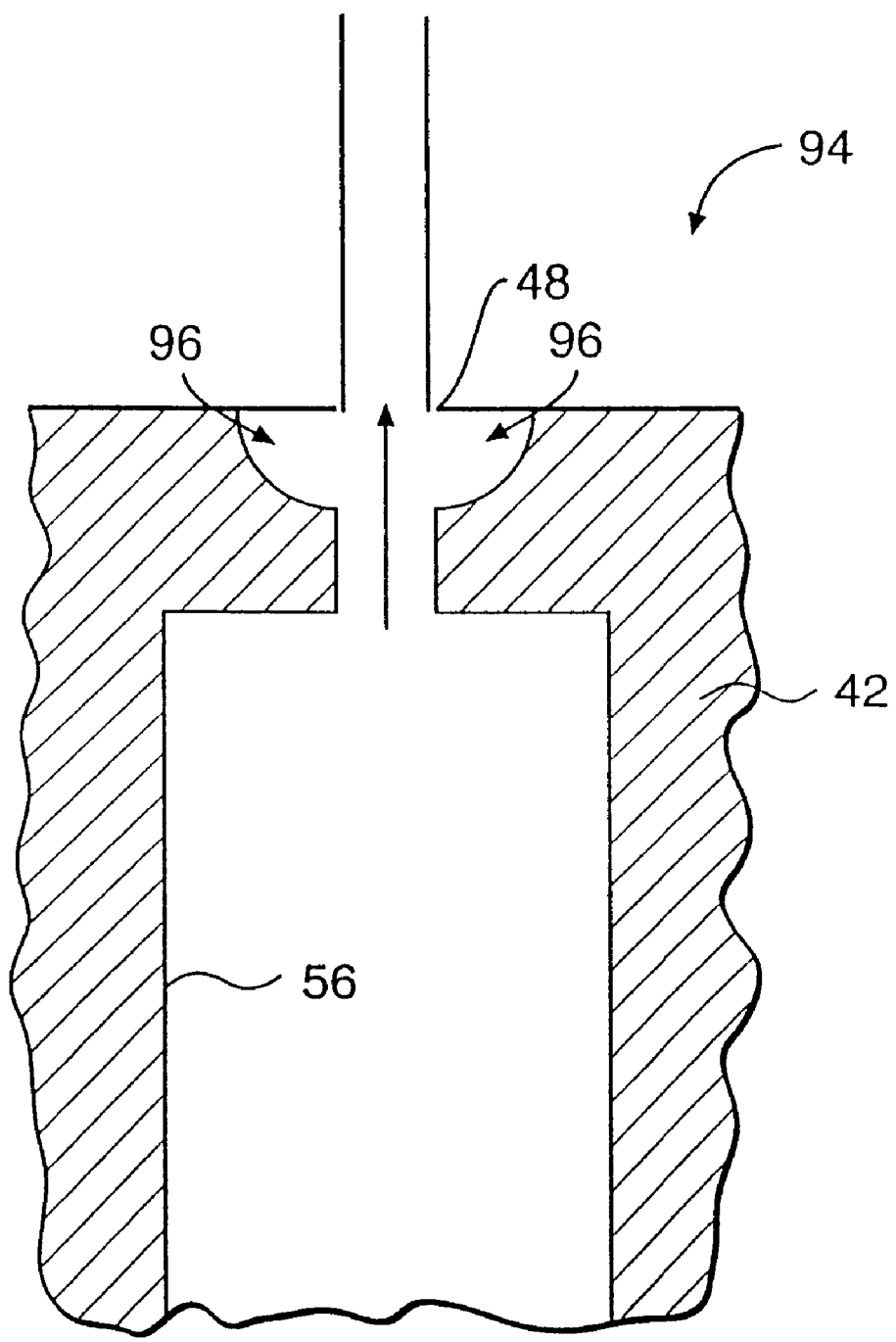
FIG. 24 is a sectional view of a fourteenth embodiment of an atomizing device according to the present invention.
Figure 25:
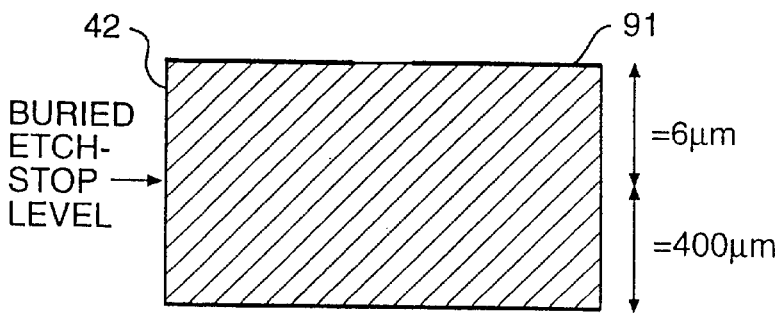
FIGS. 25 to 27 illustrate a first preferred process for forming the atomizing device of the fourteenth embodiment.
Figure 26:
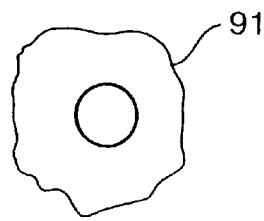
Figure 27:
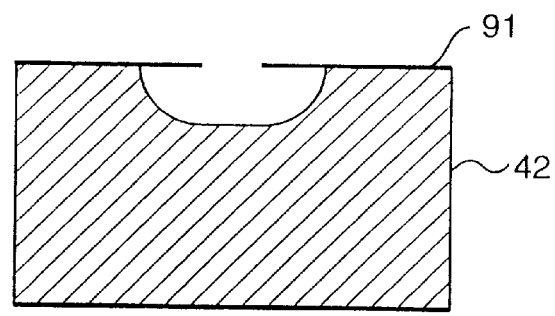
Figure 28:
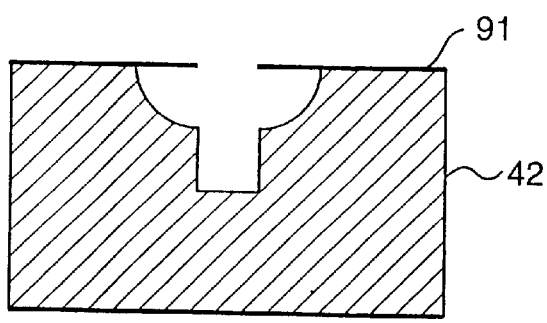
Figure 29:
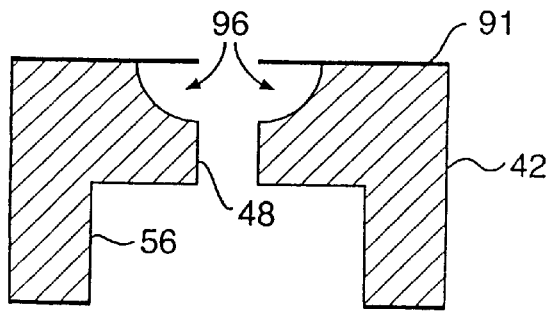
Figure 30:
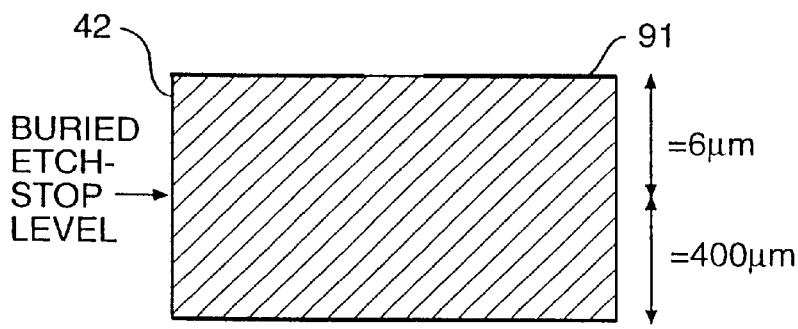
FIGS. 30 to 33 illustrate a second preferred process for forming the atomizing device of the fourteenth embodiment.
Figure 31:
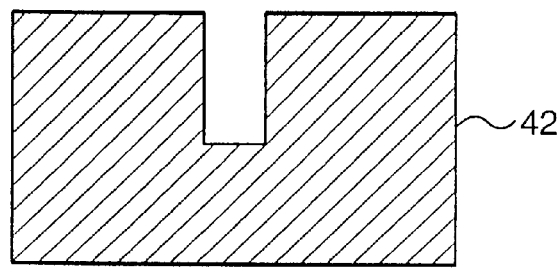
Figure 32:
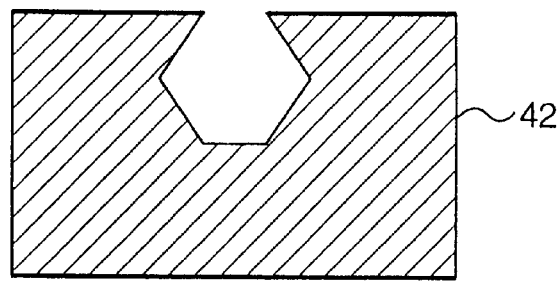
Figure 33:
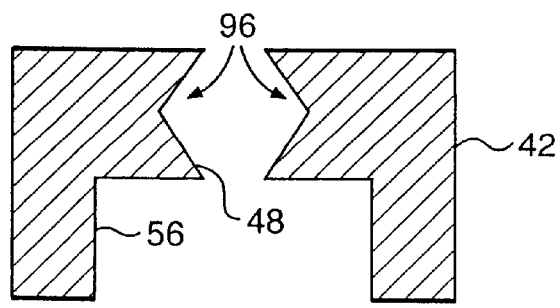
Figure 34:
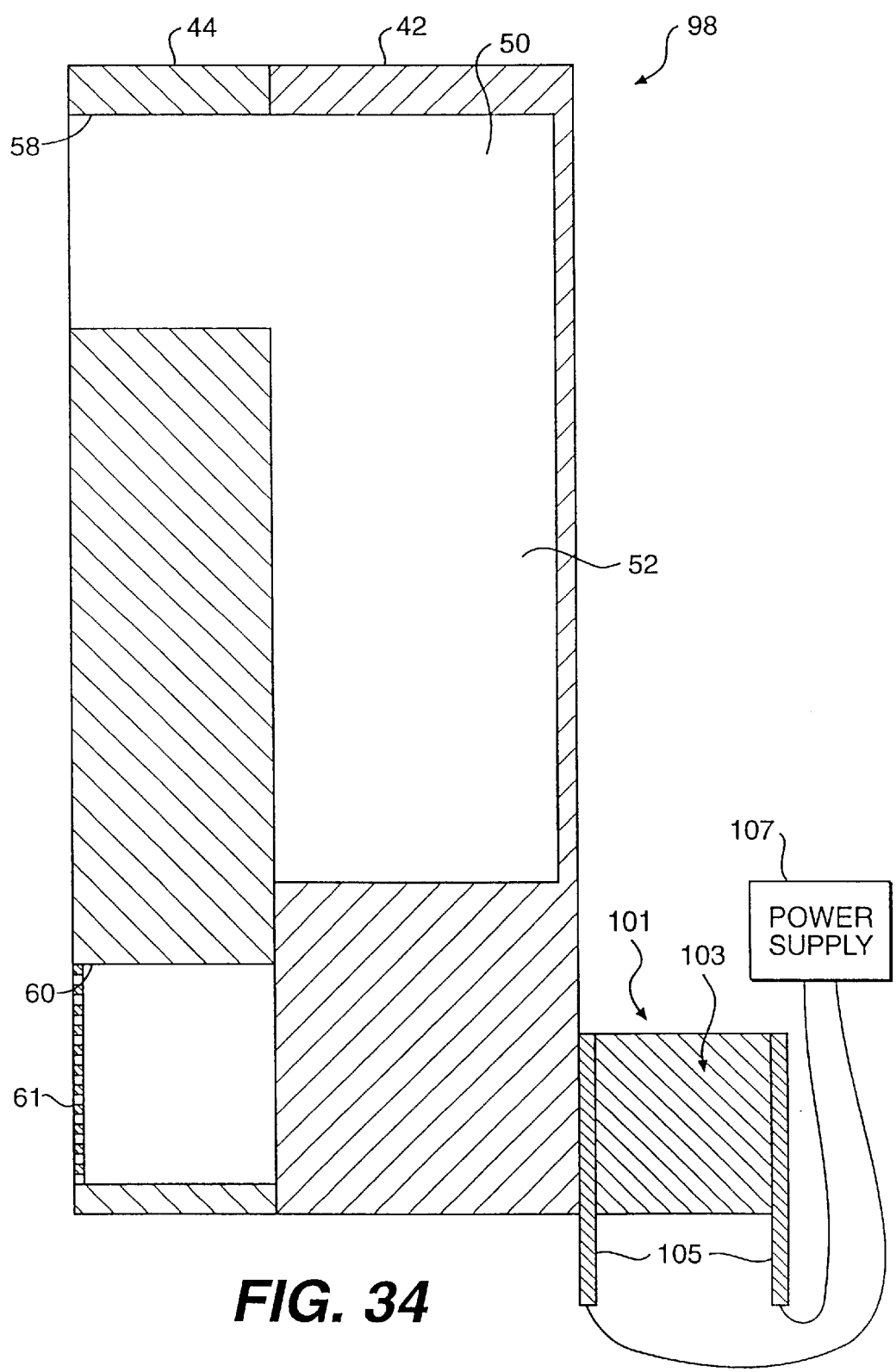
FIG. 34 is a sectional view of a fifteenth embodiment of an atomizing device according to the present invention.
Figure 35:
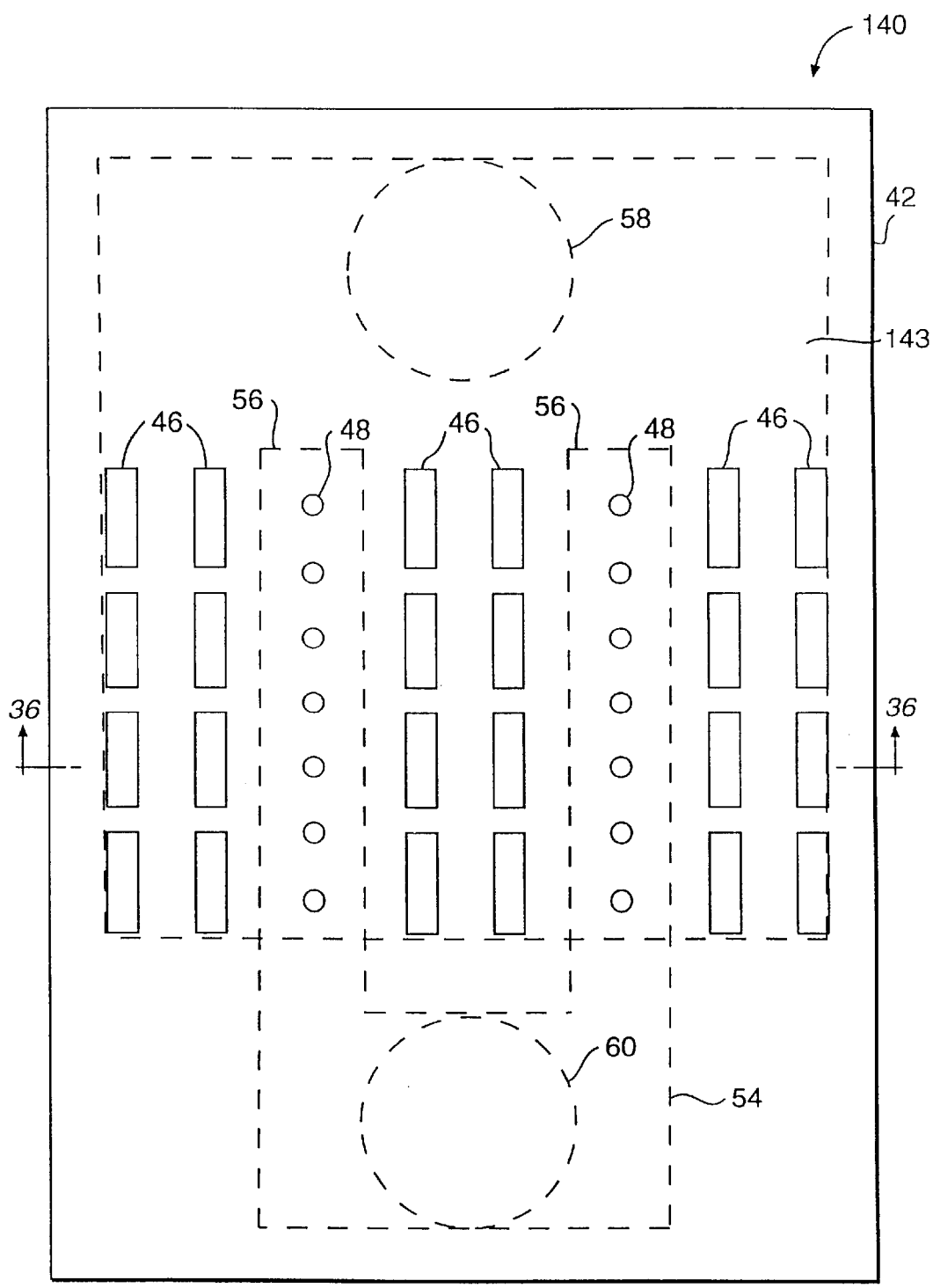
FIG. 35 is a top view of a sixteenth embodiment of an atomizing device according to the present invention.
Figure 36:
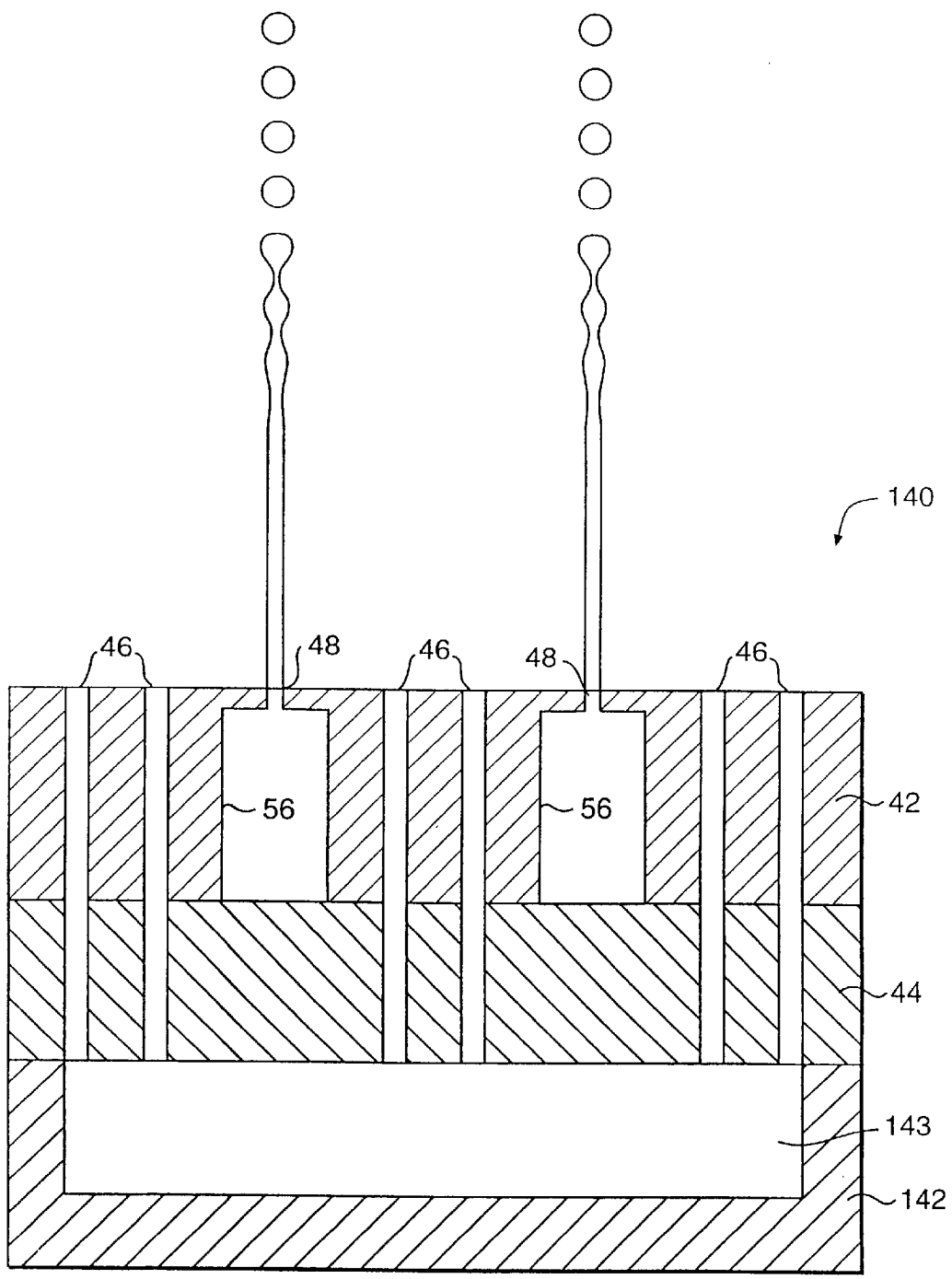
FIG. 36 is a sectional view of the sixteenth embodiment taken along line 36—36 of FIG. 35.
Figure 37:
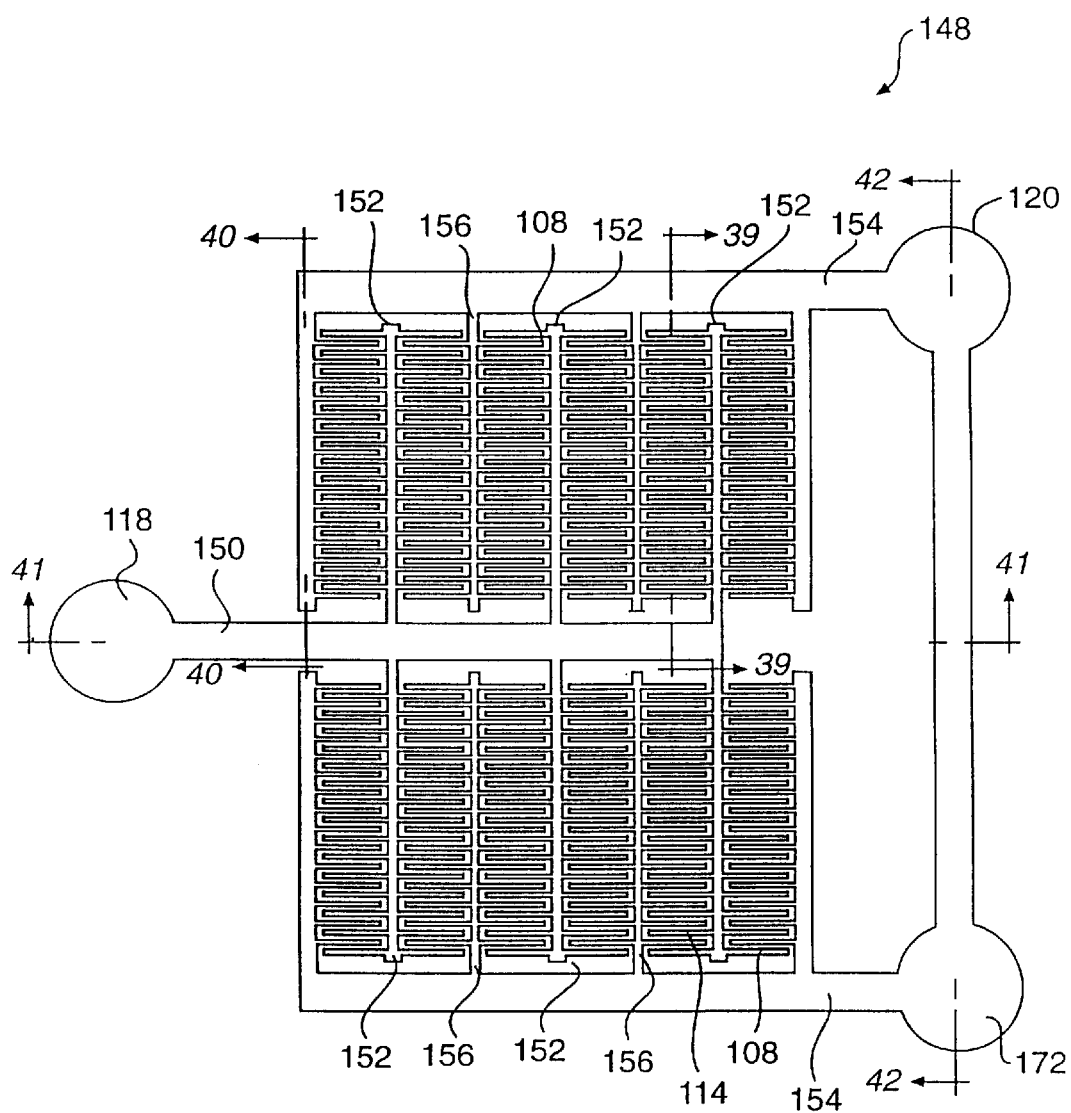
FIG. 37 is a schematic diagram of a fluid distribution network of a seventeenth embodiment of an atomizing device according to the present invention.
Figure 38:
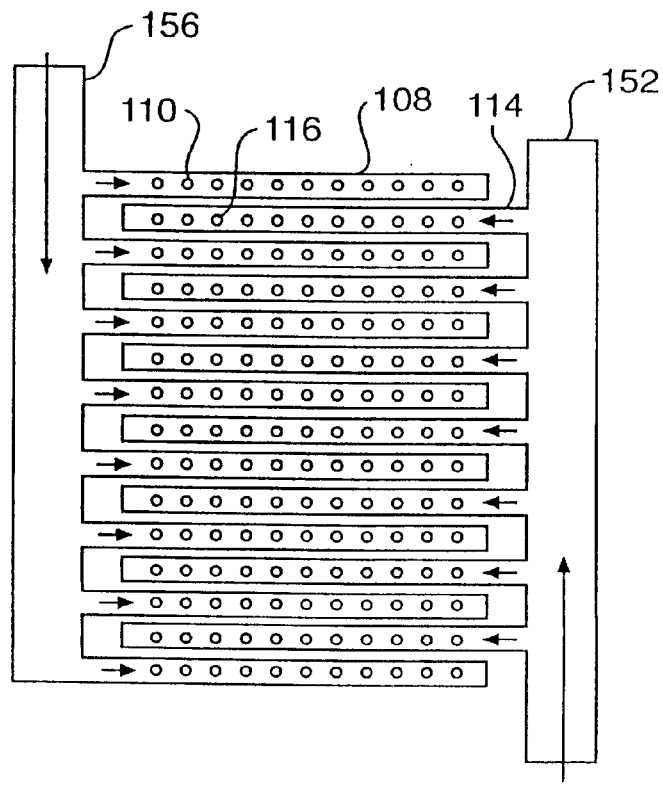
FIG. 38 is an enlarged view of a portion of the fluid distribution network of FIG. 37.
Figure 43:
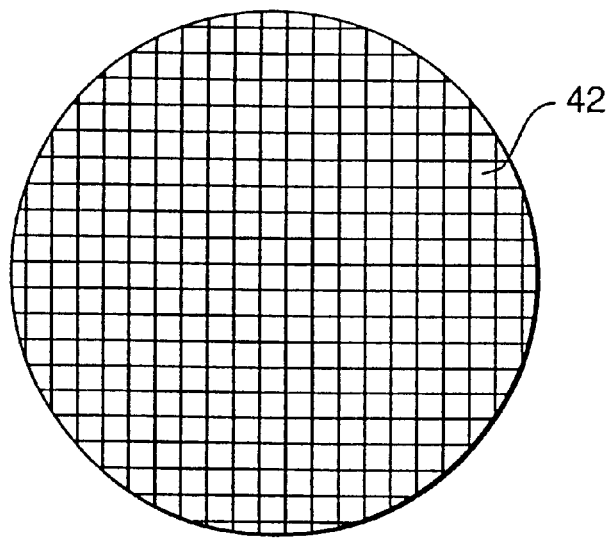
FIG. 43 is a top view of a wafer having a plurality of atomizing devices.

The fourth embodiment of an atomizing device 80 is shown in FIGS. 8 and 9. In this embodiment, two rows of liquid orifices 48 are provided for each liquid channel 56. Additionally, the gas orifices are constructed such that a direction of gas flow through the gas orifices 46 extends at an angle relative to a direction of liquid flow through the liquid orifices 48.

FIGS. 10 to 17 show partial, top views of fifth through twelfth embodiments of the present invention. More particularly, FIGS. 10 to 17 show liquid orifices 48 having various non-circular, cross-sectional shapes, which will introduce disturbances into the liquid jet that will dominate the Rayleigh breakup process and yield a monodisperse mist. These views of the liquid orifices 48 are enlarged for ease of illustration.

The most stable cross-section for a liquid jet is a perfectly circular shape. Thus, the initial disturbances in a perfectly circular liquid jet are often exceedingly small and random and, therefore, sometimes too easily perturbed by gas jets from the gas orifices 46.

It is desirable to introduce a continuous disturbance into the liquid jet that will dominate the breakup process and yield a monodisperse spray. The disturbance must have a relatively constant frequency corresponding to the specific wavelength desired for the disturbance (this frequency is related to wavelength by the jet velocity) or a wide spectrum of frequencies including the wavelength corresponding to the fastest-growing disturbance (the Rayleigh wavelength). The collapse of a non-circular, liquid jet creates an oscillation with many frequencies. Specifically, surface tension reshapes the liquid jet to eliminate edges with smaller radius of curvature than other parts of the jet's surface. This sets up an oscillation in the jet which, when properly optimized (empirically or through computation), can promote breakup into uniformly sized droplets.

The shapes shown in FIGS. 10 to 17 can be used with the same general structure shown and described in connection with any of the other disclosed embodiments. These shapes are merely exemplary, since many non-circular orifice shapes can be used.

FIGS. 18 and 24 show partial, cross-sectional views of thirteenth and fourteenth embodiments, respectively, of atomizing devices according to the present invention. These embodiments include devices that actively introduce continuous disturbances into the liquid. jet that will dominate the Rayleigh breakup process and yield a monodisperse mist.

The wavelength of a natural (passive) disturbance that grows fastest (and which therefore dominates the breakup process in the absence of an actively driven disturbance) is 4.5 times the jet diameter. Thus, the desired frequency for the disturbance can be calculated by using the formula $v=f\lambda$, where v is the velocity, f is the frequency, and $\lambda$ is the wavelength.

For example, if the jet diameter is 10 micrometers, the target wavelength is 45 micrometers. If the discharge velocity of the liquid is 10 micrometers per microsecond, it takes 4.5 microseconds for one wavelength to pass a reference point, and therefore the driving frequency should be 222 KHz. This generally applies to liquids with a viscosity approximately equivalent to water, but does not apply to high viscosity liquids.

The thirteenth embodiment shown in FIG. 18 has a liquid orifice 48 arrangement that can be used with the same general structure shown and described in connection with any of the other embodiments. In this thirteenth embodiment, thin, flexible strips 90 are provided at the outlet of each of the liquid orifices 48. These strips 90 introduce a disturbance in the liquid jet.

These flexible strips 90 extend from the edge of the liquid orifices 48 into the liquid flow stream so that as the liquid streams out of the liquid orifice 48, the flexible strips 90 flap in the flow stream. This flapping passes a spontaneous oscillation into the liquid as it passes through the liquid orifice 48. When structured (in terms of thickness, length, and stiffness) so that the wavelength of the flapping oscillation is comparable to the wavelength needed for Rayleigh breakup, the spontaneous oscillation frequency will be in the right range for facilitating Rayleigh breakup of the liquid jet. Generally, each flexible strip 90 preferably has a width less than one-tenth of the diameter of the liquid orifice 48 and a length less than one-half the diameter of the liquid orifice 48.

The preferred process for making the atomizing device of the thirteenth embodiment can be explained in conjunction with FIGS. 19 to 23.

As shown in FIG. 19, a high strength surface mask 91 is deposited or grown on the first layer 42. The mask 91 is preferably silicon nitride or silicon dioxide and silicon nitride. The strips 90 are included in the hole pattern for the liquid orifice 48, as shown in FIG. 20. Then, the liquid orifice 48 is formed as shown in FIG. 21, preferably by using a vertical-wall micromachining process, and most preferably by using the RIE process.

As shown in FIG. 22, a second etch step is performed to remove silicon under the thin flexible strips 90. This second step of etching may be either an isotropic etch (e.g., plasma etch) or a crystallographic etch (e.g., potassium hydroxide), as long as the sides of the silicon under the strips 90 are not (111) planes. This will result in some expansion of the orifice, so the mask opening size must compensate for this expansion.

Next, as shown in FIG. 23, the liquid channels 56 for the liquid orifices 48 are formed in the manner described above in regard to the first embodiment.

The fourteenth embodiment of an atomizing device 94 shown in FIG. 24 has a liquid orifice 48 arrangement that can be used with the same general structure shown and described in connection with any of the other embodiments. In this fourteenth embodiment, fluidic feedback oscillators 96 are provided near the outlet of each of the liquid orifices 48. These fluidic feedback oscillators 96 introduce a disturbance into the liquid jet.

The fluidic feedback oscillators 94 are formed by creating recirculation portions in the liquid orifice 48, which create recirculation zones in the liquid flow pattern. These recirculation zones are feedback loops that create the conditions for spontaneous oscillation to occur in the liquid as it passes through the liquid orifice 48. When the fluidic feedback oscillators 96 are structured so that the wavelength of the feedback oscillation is comparable to the wavelength needed for Rayleigh breakup, the spontaneous oscillation frequency will be in the right range for facilitating Rayleigh breakup of the liquid jet.

Figure 42:
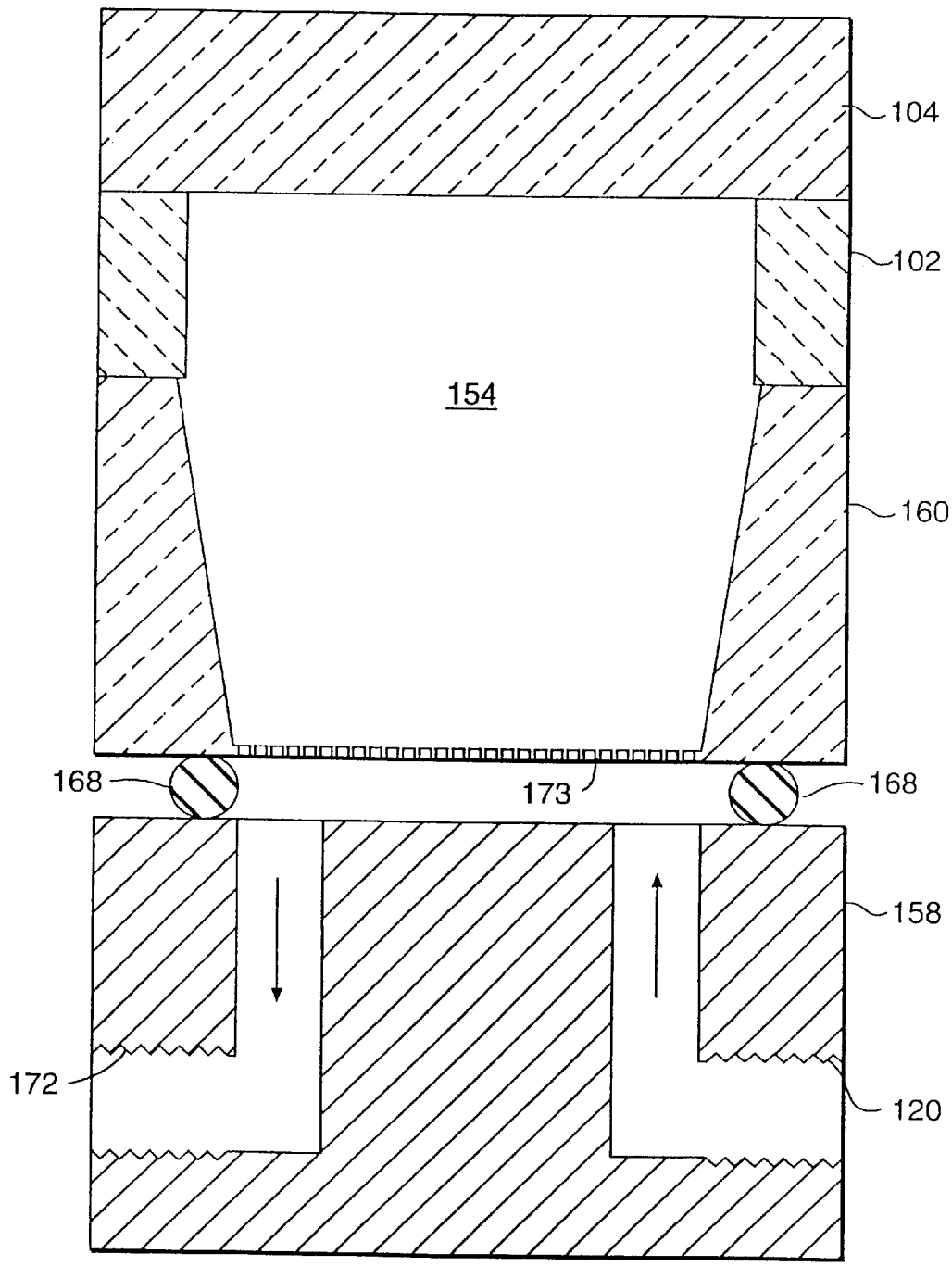
FIG. 42 is a sectional view of the seventeenth embodiment taken along line 42—42 of FIG. 37.

The desired frequency can be easily achieved with the fluidic feedback oscillators 96. The period of oscillation is approximately equal to twice the time for the fluid to travel one flow feedback path. Therefore the flow feedback path length should be on the order of 2 times the jet diameter. The specific geometry can be determined empirically.

A first preferred process for making the atomizing device 94 of the fourteenth embodiment can be explained in conjunction with FIGS. 25–29.

As shown in FIG. 25, a high-strength mask 91 is deposited or grown on the first layer 42. The mask 91 is preferably silicon nitride or silicon dioxide and silicon nitride.

Next, the feedback oscillators 96 are formed, as shown in FIG. 27, preferably, by using an isotropic silicon etch. For example, this isotropic etch could be a plasma etch.

As shown in FIG. 28, if the desired depth of the feedback oscillators 96 is less than the desired depth of the liquid orifice 48, a second orifice etch step is performed, preferably using a vertical-wall (anisotropic) silicon etch. For example, this anisotropic etch could be an RIE process.

Next, as shown in FIG. 29, the liquid channels 56 for the liquid orifices 48 are formed in the manner described above in regard to the first embodiment.

Another process for making the atomizing device of the fourteenth embodiment can be explained in conjunction with FIGS. 30 to 33.

As shown in FIG. 30, a high-strength mask 91 is deposited or grown on the first layer 42. The mask 91 is preferably silicon nitride or silicon dioxide and silicon nitride. As shown in FIG. 31, a vertical-wall micromachining process, such as the RIE process, is used to make an orifice.

In a second etching step, a crystallographic etch, such as a potassium hydroxide etch, is performed to produce the shape shown in FIG. 32.

Next, the liquid channels 56 for the liquid orifices 48 are formed in the manner described above in regard to the first embodiment. In this embodiment, the buried etch stop is used in both the second and the third. etches.

FIG. 34 shows a cross-sectional view of a fifteenth embodiment of an atomizing device 98 according to the present invention. This embodiment provides a bulk ceramic piezoelectric oscillator 101 that can be used with any of the other embodiments.

The piezoelectric oscillator 101 includes a piezoceramic plate 103 and copper foils 105. The copper foils 105 are connected to a high-voltage AC power supply 107 that supplies a drive voltage to the piezoelectric oscillator 101. The drive voltage can be varied to change the frequency of the oscillator 101 to a desired frequency for Rayleigh breakup.

The dominating disturbance in all the liquid jets of the array can be provided by this piezoelectric oscillator 101, which can be located on the frontside, backside, or side of the layers. The disadvantage of the piezoelectric oscillator—it requires an external high-voltage frequency generator—is offset by the advantage that it allows control of the drive frequency independent of the liquid flow rate.

FIGS. 35 and 36 show a sixteenth embodiment 140 of an atomizing device. This embodiment is the same as the first embodiment shown in FIGS. 1 to 3, except this sixteenth embodiment has a different gas supply network. This gas supply network can be used with any of the preceding embodiments.

The atomizing device 140 includes a substantially planar plenum layer 142, which forms a plenum 143 for gas. The gas port 58 supplies gas from a gas reservoir to the plenum 143, which in turn supplies gas to the gas orifices 46. The plenum layer 142 preferably is formed from silicon, although it could be formed of other materials such as PYREX.

The gas orifices 46 have a significantly greater thickness than in the first embodiment, extending through the first and second layers 42 and 44 so as to be in fluid communication with the plenum 143. Otherwise, the gas orifices 46, and the other components of the embodiment, preferably have the dimensions as in the first embodiment. The liquid orifices 48 and liquid channels 56 preferably have the same dimensions as in the first embodiment.

The atomizing device 140 of this sixteenth embodiment can be produced in batches on wafers, similar to the atomizing device of the first embodiment. The inner surfaces of each layer are preferably formed using a vertical-wall micromachining process. The layers are then aligned and connected by silicon fusion bonding to form the atomizing device 140.

A seventeenth embodiment 148 of the invention is shown in FIGS. 37 to 42. This embodiment is similar in many respects to the first embodiment shown in FIGS. 1 to 3. However, this seventeenth embodiment has relatively complex gas and liquid supply networks including conduits, passages, and interdigitated supply channels. These supply networks can also be used with the other embodiments.

As shown generally in FIG. 37, gas enters through a gas port 118 and flows through a conduit 150 to smaller passages 152. The gas from the passages 152 flows into even smaller channels 108, which supply the gas to gas orifices 110. Similarly, the liquid enters through a liquid port 120, flows through conduits 154, flows through smaller passages 156, and flows through even smaller channels 114, which supply the liquid to liquid orifices 116.

As shown in FIG. 39, the atomizing device includes a connection block 158, a substantially planar filter layer 160, a substantially planar first layer 102, and a substantially planar second layer 104. :Each of the filter layer 100, first layer 102, and second layer 104 preferably has a length and a width determined by the desired liquid atomization rate (based on a chip rating such as 10 milliliters per minute per square millimeter of orifices), and a thickness within the standard range for silicon wafers (e.g., 500 micrometers) used for bulk micromachining or within the standard range for PYREX (e.g., 500 micrometers up to 4 millimeters thick).

The connection block 158 has a gas port 118 and a liquid port 120 for connection to gas and liquid reservoirs. The connection block 158 is preferably made of steel or other machinable material that is impervious to the liquid.

As shown in FIG. 41, the filter layer 160 has a gas main supply 162 that feeds gas to the gas conduit 150. The gas main supply 162 is connected to the gas port 118 through an O-ring 164.

The filter layer 160 also has a liquid main supply 166 that feeds the liquid to the liquid conduits 154. The liquid main supply 166 is connected to the liquid port 120 through an O-ring 168.

The liquid main supply 166 includes a plurality of elongated channels 170 (FIGS. 41 and 42). Each of these channels 170 has filter pores 173 at its inlet. These filter pores 173 can, for example, be circular or square, and preferably have widths of less than or equal to ⅓ of the width of the liquid orifices 116. As shown in FIG. 42, the filter pores 173 can be flushed by flowing fluid into the liquid port 120 and out through a flushing port 172. During normal operation, this flushing port 172 is closed, unless a recirculating liquid pump system is used.

Figure 39:
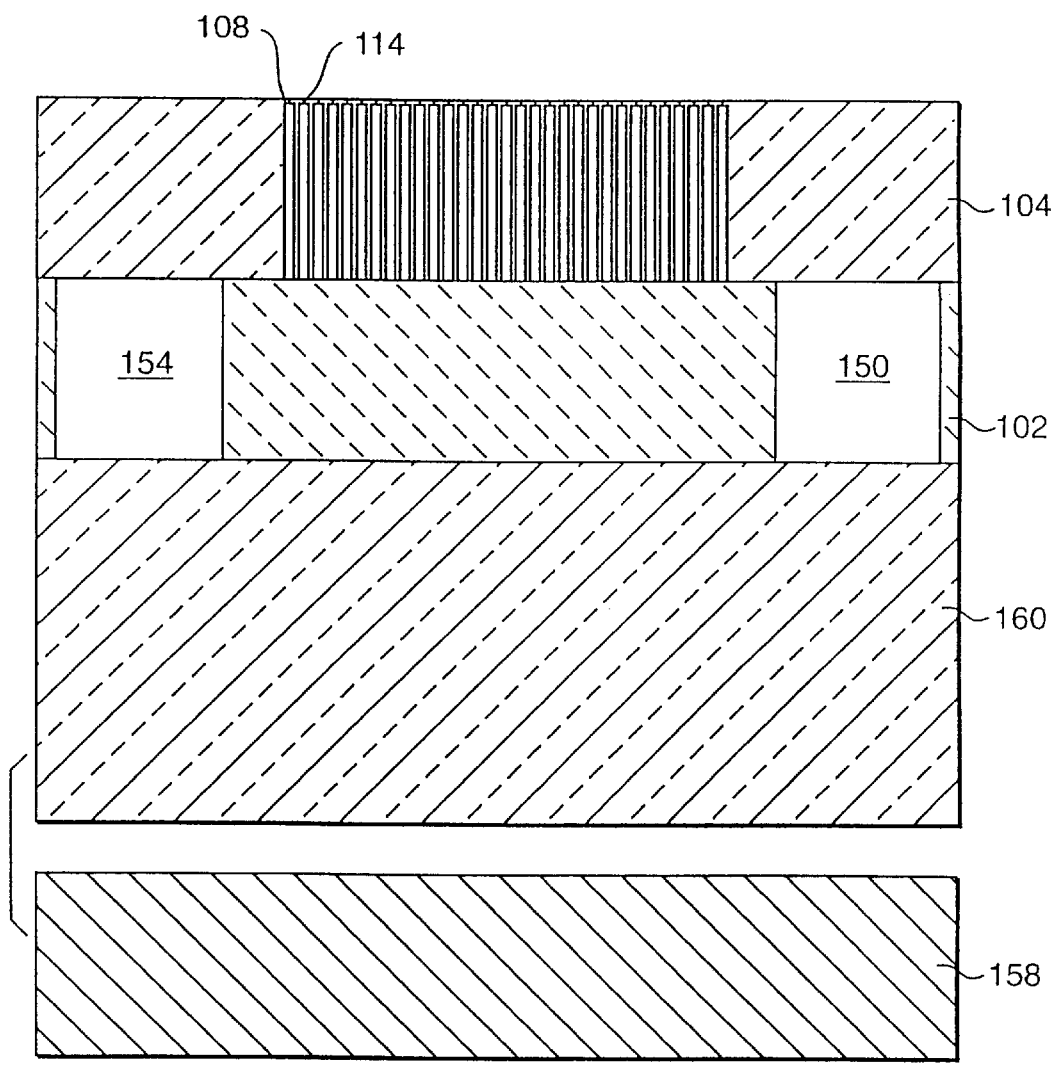
FIG. 39 is a sectional view of the seventeenth embodiment taken along line 39—39 of FIG. 37.
Figure 40:
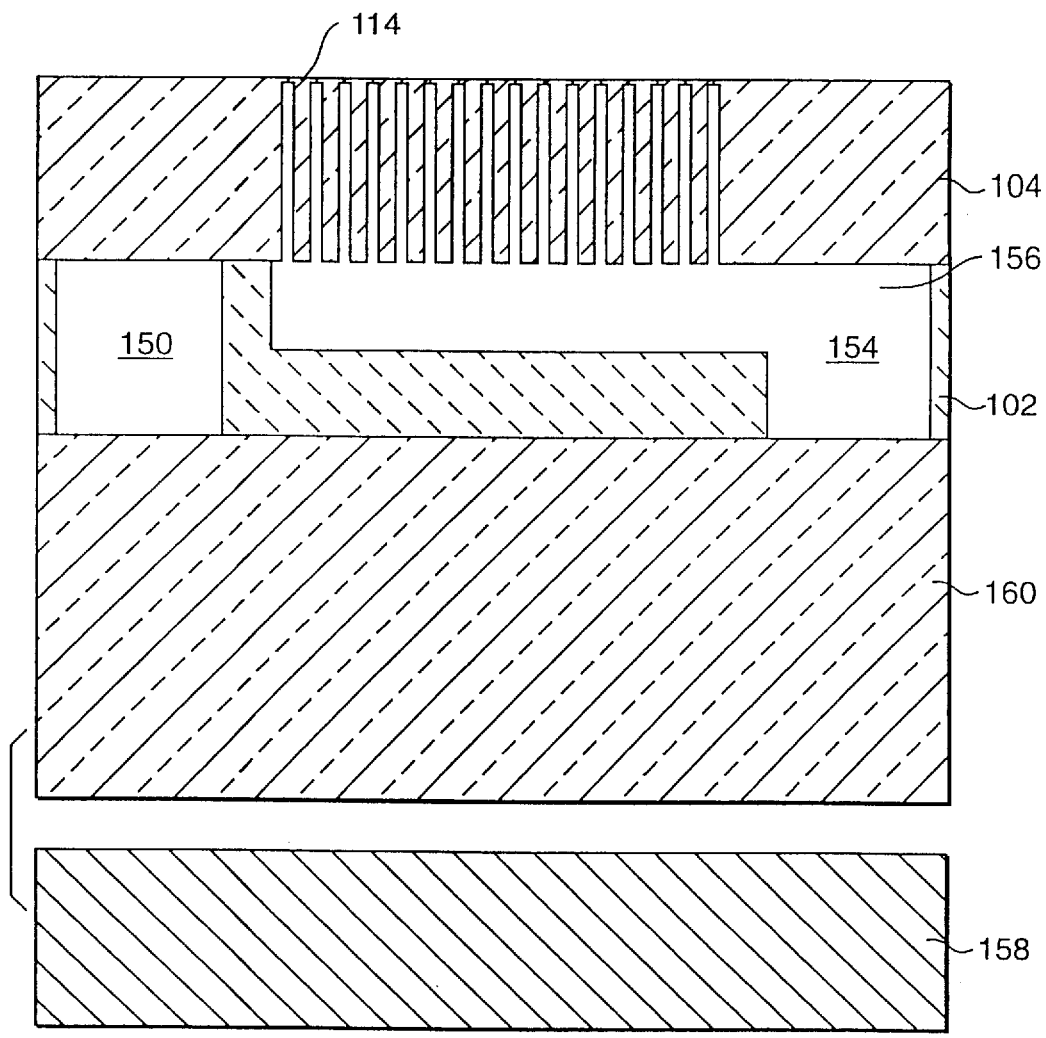
FIG. 40 is a sectional view of the seventeenth embodiment taken along line 40—40 of FIG. 37.
Figure 41:
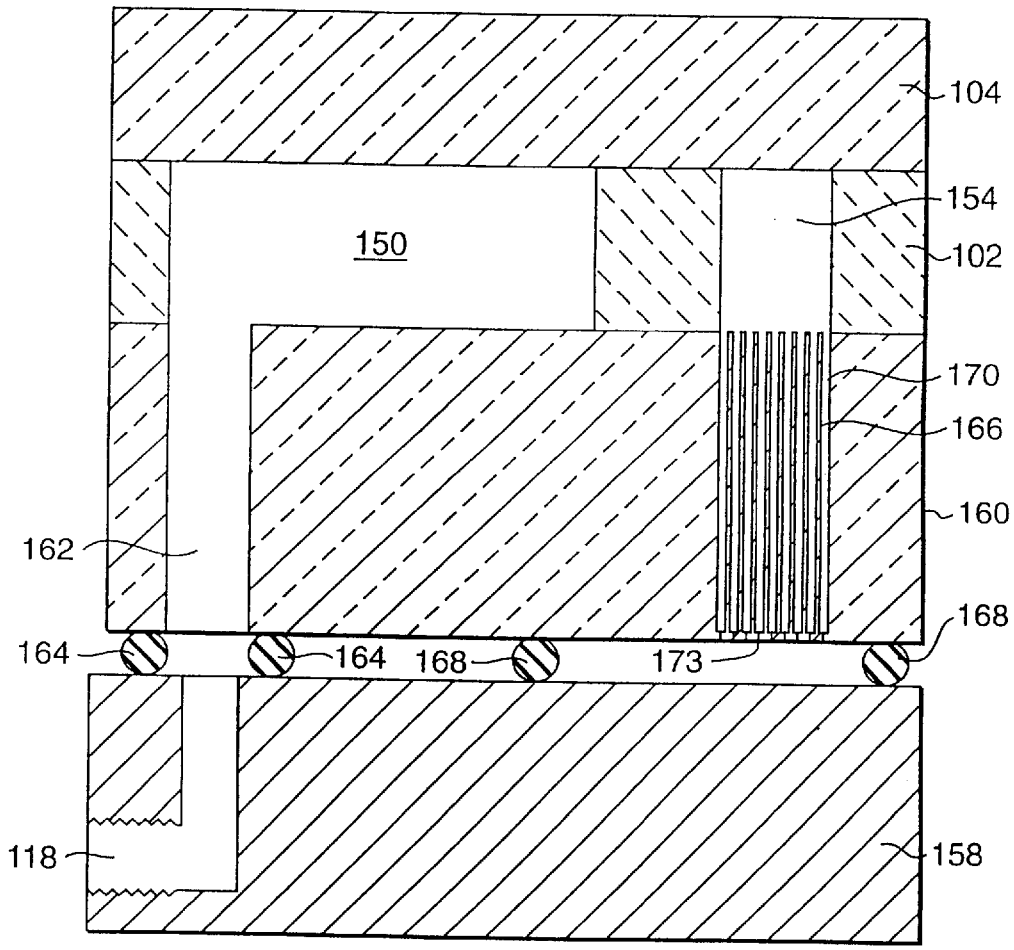
FIG. 41 is a sectional view of the seventeenth embodiment taken along line 41—41 of FIG. 37.

Unlike the second layer 104 and filter layer 160, the first layer 102 is preferably made of PYREX. The first layer 102 has gas and liquid conduits 150 and 154 (FIG. 39) that are in fluid communication with the gas and liquid main supplies 102 and 166. The first layer 102 also has gas passages 152 (not shown in section) and liquid passages 156 (FIG. 40) that are in fluid communication with the gas and liquid conduits 150 and 154.

The second layer 104 has gas and liquid channels 108 and 114 (FIG. 39) that are in fluid communication with the gas and liquid passages 152 and 156 and are preferably interdigitated. The gas and liquid channels 108 and 114 provide gas and liquid to gas and liquid orifices 110 and 116 formed in a surface of the second layer 104. The gas and liquid channels 108 and 114 and the gas and liquid orifices 110 and 116 preferably have the same dimensions as the channels and orifices of the first embodiment.

The atomizing device 148 of this seventeenth embodiment can be produced in batches on wafers, similar to the atomizing device of the first embodiment. The inner surfaces of each layer are preferably formed using a vertical-wall micromachining process. However, the inner surfaces of the first layer 102, which is formed of PYREX, are preferably formed by ultrasonic machining. The filter, first, and second layers are then aligned and connected by anodic bonding. The gas and liquid ports 118 and 120 of the connection block 158, which is made of steel, are preferably formed by common machining methods, and the plenum, first, and second layers are then connected to the connection block through O-rings 164 and 168 (or a sealing gasket) to form the atomizing device.

The present invention provides various advantages.

Atomizing devices according to the present invention can provide a spray in which 90% of the liquid volume in the spray will be in droplets with diameters plus or minus 50% of the Sauter mean diameter. In other words, the present invention provides a monodisperse spray.

Atomizing devices according to the present invention can have a low gas-liquid mass ratio of, for example, less than 2.

The present invention intersperses gas orifices among the liquid orifices to prevent liquid jets from getting trapped by droplets on the surface of the atomizing device. For example, a 1 micron diameter jet cannot break through a 1 millimeter thick pool of liquid sitting on the orifice of the atomizing device. The gas orifices prevent thick pools of liquid from forming on the surface of the atomizing device.

The present invention solves the problem of droplet coalescence due to high drag forces on very small droplets. Very small droplets slow down quickly in air, are hit by the droplets behind them, and combine to form larger droplets. This seriously degrades the monodisperse characteristic of the spray. The present invention overcomes this problem by providing a gas coflow, at and beyond the point of liquid jet breakup, which has a velocity high enough to keep most droplets from hitting each other, thus preventing coalescence. The coflow also provides turbulence that is very effective at shifting droplet trajectories out of the stream from the liquid jet. A combination of turbulence and coflow velocity approximately equal to or greater than the jet velocity is required after the jets have broken up.

The present invention does not allow the coflow air jets to disturb the Rayleigh breakup process, or to cause secondary atomization of the droplets. Coflow velocity is kept low close to the liquid orifices by positioning the gas orifices at an appropriate distance.

The present invention prevents the orifices from becoming partially obstructed by providing a high-quality, non-shedding filter as an integral part of the atomizing device, preferably in such a way that the end user never opens the atomizing device between the filter and the micronozzle array chip.

The present invention provides atomizing devices with fluidic oscillators that produce dilational or varicose waves in the jet have an advantage over those that produce sinuous waves. Only pressure and the fluidic oscillator structure is required to achieve an active, well-controlled disturbance of the liquid jet. Also, the fluidic oscillators have the desirable characteristic that the frequencies tend to be proportional to discharge velocity so that the wavelength of the disturbance is constant, just as the wavelength of the natural (passive) disturbance that grows fastest in the jet also is constant.

The present invention minimizes the pressure drop for an orifice by keeping the orifice thickness short compared to the orifice diameter (in this invention, typically the thickness-to-diameter ratio of the orifice is less than 4, and is often less then 1). Conventional machining techniques cannot produce strong orifices with a thickness of a few microns. However, with micromachining techniques and layer bonding techniques, strong orifices with thicknesses of a few microns can be made (e.g., a 4 micron thick orifice on a 100 micron wide channel is able to withstand 100 psi of supply pressure without cracking or rupturing).

Additionally, these atomizing devices can be formed by processes that permit batch production, thus allowing for simultaneous production of hundreds to possibly more than a million atomizing devices on a chip.

The present invention also provides for the formation of large arrays of orifices. This is important for obtaining high flow rates, or for scaling up the flow rate to a production environment.

These atomizing devices are also made by methods that allow each device to be made precisely the same and in accordance with precise dimensional requirements. This is important for obtaining reproducible spray characteristics from one atomizing device to the next, or from one batch to the next.

The present invention produces uniformly sized droplets, which are important in certain applications such as materials processing (e.g., pharmaceutical powder production by a spray-drying process) and medical nebulizers.

The present invention provides high pressure operation of large arrays of nozzles with small thickness by keeping the ratio of (a) supply channel width to (b) orifice thickness low enough so that cracking and/or rupturing do not occur.

The present invention supplies fluid to large arrays of orifices, without requiring a lot of space, by using efficient, space-saving networks of supply channels. These networks can be made efficiently via batch production. Tens, hundreds, or even thousands of supply channels can be formed simultaneously in a layer or stack of layers, rather than being formed one channel at a time. Also, multiple layers of supply channels can be formed. This is important for supplying large arrays of orifices.

The present invention also allows multifluid arrays in which neighboring orifices release different fluids.

It will be apparent to those skilled in the art that various modifications and variations can be made in the apparatus of the present invention without departing from the scope or spirit of the invention.

Other embodiments of invention will be apparent to those skilled in the art from consideration of the specification and practice of the invention disclosed herein. It is intended that the specification and examples be considered as exemplary only, with a true scope and spirit of the invention being indicated. by the following claims.

We claim:

1. A method of atomizing a liquid, comprising the steps of
   providing an etchable material;
   etching said etchable material to form a liquid orifice and a gas orifice;
   flowing a jet of liquid through said liquid orifice to form droplets of the liquid through Rayleigh breakup; and
   flowing a gas through said gas orifice and against the droplets to inhibit coalescence of the droplets.

2. The method of claim 1, wherein the gas does not perturb the jet of liquid before the liquid breaks into droplets.

3. The method of claim 2, wherein a difference between velocities of the liquid and gas is kept below a first wind threshold along a surface of the jet.

4. The method of claim 1, wherein the gas is flowed at a velocity such that it does not cause secondary atomization of the droplets.

5. The method of claim 1, wherein coalescence of the droplets is inhibited by providing sufficient gas velocity to inhibit reduction in spacing between droplets.

6. The method of claim 1, wherein coalescence of the droplets is inhibited by providing sufficient gas turbulence to shift trajectory of a droplet such that the droplet will not collide with an adjacent droplet.

7. The method of claim 1, further comprising the step of introducing a disturbance into the jet of liquid to promote Rayleigh breakup.

8. An atomizing device comprising:
   a liquid orifice for forming a jet of liquid that breaks into droplets of the liquid through Rayleigh breakup, the liquid orifice includes a fluid pathway for introducing a disturbance into the jet of liquid;
   a gas orifice for flowing a gas against the droplets to inhibit coalescence of the droplets.

9. The atomizing device of claim 8, further comprising a plurality of gas orifices and a plurality of liquid orifices.

10. The atomizing device of claim 8, wherein a direction of gas flow through the gas orifice is substantially parallel to a direction of liquid flow through the liquid orifice.

11. The atomizing device of claim 8, wherein a direction of gas flow through the gas orifice extends at an angle relative to a direction of liquid flow through the liquid orifice.

12. The atomizing device of claim 8, wherein the gas orifice is spaced from the liquid orifice by a distance such that the gas does not perturb the jet of liquid before it breaks into droplets.

13. The atomizing device of claim 8, wherein the liquid orifice has a noncircular cross-sectional shape.

14. The atomizing device of claim 8, wherein the liquid orifice includes strips projecting into the liquid to introduce a disturbance into the jet of liquid.

15. The atomizing device of claim 8, further comprising a substantially planar first layer, wherein the first layer forms the liquid and gas orifices.

16. The atomizing device of claim 15, further comprising a substantially planar second layer, wherein the first and second layers form a gas supply network including a gas channel that supplies gas to the gas orifice, and a liquid supply network including a liquid channel that supplies liquid to the liquid orifice.

17. An atomizing device comprising;
   a liquid orifice for forming a jet of liquid that breaks into droplets of the liquid through Rayleigh breakup;
   a gas orifice for flowing a gas against the droplets to inhibit coalescence of the droplets;
   a substantially planar first layer, wherein the first layer forms the liquid and gas orifices.

18. The atomizing device of claim 17, further comprising a substantially planar second layer, wherein the first and second layers form a gas supply network including a gas channel that supplies gas to the gas orifice, and a liquid supply network including a liquid channel that supplies liquid to the liquid orifice.

19. The atomizing device of claim 18, wherein a direction of gas flow through the gas channel is substantially perpendicular to a direction of gas flow through the gas orifice, and a direction of liquid flow through the liquid channel is substantially perpendicular to a direction of liquid flow through the liquid orifice.

20. The atomizing device of claim 18, further comprising a plurality of gas orifices and a plurality of liquid orifices, wherein the gas supply network includes a plurality of gas channels that supply gas to the gas orifices, and the liquid supply network includes a plurality of liquid channels that supply liquid to the liquid orifices.

21. The atomizing device of claim 20, wherein each liquid channel is adjacent at least one gas channel.

22. The atomizing device of claim 18, further comprising a filter for filtering liquid supplied to the liquid channel.

23. The atomizing device of claim 18, wherein at least one of the first and second layers includes an elemental semiconductor material.

24. The atomizing device of claim 23, wherein at least one of the first and second layers includes silicon.

25. The atomizing device of claim 1, further comprising a plenum layer, which forms a plenum for supplying gas to the gas orifice.

26. The atomizing device of claim 20, wherein the gas supply network further includes a plurality of gas passages, which are larger than the gas channels and supply gas to the gas channels, and the liquid supply network further includes a plurality of liquid passages, which are larger than the liquid channels and supply liquid to the liquid channels.

27. The atomizing device of claim 26, wherein the gas supply network further includes a gas conduit, which is larger than the gas passages and supplies gas to the gas passages, and the liquid supply network further includes a liquid conduit, which is larger than the liquid passages and supplies liquid to the liquid passages.

28. A method of forming an atomizing device, comprising the steps of:
   forming a gas supply network and a liquid supply network in a substantially planar first layer and a substantially planar second layer;
   forming a liquid orifice in the first layer that forms a jet of liquid that breaks into droplets of the liquid through Rayleigh breakup;
   forming a gas orifice in the first layer for flowing gas against the droplets to inhibit coalescence of the droplets; and connecting the first and second layers such that the gas and liquid supply networks supply gas and liquid to the gas and liquid orifices, respectively.

29. The method of claim 28, wherein at least one of the first and second layers includes an elemental semiconductor material of silicon.

30. The method of claim 29, wherein at least one of the first and second layers includes silicon.

31. An atomizing device comprising:
a liquid orifice for forming a jet of liquid that breaks into droplets of the liquid through Rayleigh breakup; and
said liquid orifice having orifice walls, said orifice walls including oscillation-forming recesses that create a vibration in the jet of liquid to promote Rayleigh breakup.

32. The atomizing device of claim 31, wherein the device includes a noncircular cross-sectional shape in the liquid orifice.

33. The atomizing device of claim 31, wherein the device includes a pair of strips that project into the jet of liquid.

34. The atomizing device of claim 17, wherein the liquid orifice includes a fluid pathway for introducing a disturbance into the jet of liquid.

35. The atomizing device of claim 17, further comprising a plurality of gas orifices and a plurality of liquid orifices.

36. The atomizing device of claim 17, wherein a direction of gas flow through the gas orifice is substantially parallel to a direction of liquid flow through the liquid orifice.

37. The atomizing device of claim 17, wherein a direction of gas flow through the gas orifice extends at an angle relative to a direction of liquid flow through the liquid orifice.

38. The atomizing device of claim 17, wherein the gas orifice is spaced from the liquid orifice by a distance such that the gas does not perturb the jet of liquid before it breaks into droplets.

39. The atomizing device of claim 17, wherein the liquid orifice has a noncircular cross-sectional shape.

40. The atomizing device of claim 17, wherein the liquid orifice includes strips projecting into the liquid to introduce a disturbance into the jet of liquid.

* * * * *